(12) United States Patent
Rendl

(10) Patent No.: US 12,366,561 B2
(45) Date of Patent: Jul. 22, 2025

(54) MONITORING SAMPLE INJECTORS

(71) Applicant: DIONEX SOFTRON GMBH, Gemering (DE)

(72) Inventor: Martin Rendl, Munich (DE)

(73) Assignee: Dionex Softron GmbH, Germering (DE)

(*) Notice: Subject to any disclaimer, the term of this patent is extended or adjusted under 35 U.S.C. 154(b) by 676 days.

(21) Appl. No.: 17/572,776

(22) Filed: Jan. 11, 2022

(65) Prior Publication Data

US 2022/0229028 A1 Jul. 21, 2022

(30) Foreign Application Priority Data

Jan. 18, 2021 (DE) .................. 10 2021 100 915.4

(51) Int. Cl.
  G01N 30/88 (2006.01)
  G01M 3/26 (2006.01)
  G01N 30/22 (2006.01)

(52) U.S. Cl.
  CPC .............. G01N 30/88 (2013.01); G01M 3/26 (2013.01); G01N 30/22 (2013.01)

(58) Field of Classification Search
  CPC ..... G01M 3/26; G01M 3/2815; G01F 1/6842; G01F 1/6847; G01F 1/6888; G01F 1/69; G01F 1/6965; G01F 25/10; F04B 13/00; F04B 2201/0601; F04B 2205/04; F04B 49/022; F04B 49/03
  See application file for complete search history.

(56) References Cited

U.S. PATENT DOCUMENTS

| | | | |
|---|---|---|---|
| 8,806,922 B2* | 8/2014 | Hochgraeber | G01N 30/32 73/61.55 |
| 10,054,569 B2* | 8/2018 | Song | G01N 30/32 |
| 10,386,342 B2* | 8/2019 | Hochgraeber | G01N 30/32 |
| 2010/0288025 A1* | 11/2010 | Hochgraeber | G01N 30/20 73/61.55 |
| 2014/0121976 A1 | 5/2014 | Kischkat | |
| 2016/0327514 A1* | 11/2016 | Shoykhet | G01N 30/32 |
| 2017/0328202 A1 | 11/2017 | Hsu et al. | |
| 2020/0319146 A1* | 10/2020 | Hollnagel | G01N 30/461 |

FOREIGN PATENT DOCUMENTS

| | | |
|---|---|---|
| CN | 111796032 A | 10/2020 |
| CN | 101925812 A | 12/2020 |
| DE | 102008006566 A1 | 7/2009 |
| DE | 102008006266 B4 | 6/2011 |
| EP | 2438435 B1 | 8/2014 |

* cited by examiner

Primary Examiner — Kristina M Deherrera
Assistant Examiner — Gedeon M Kidanu

(57) ABSTRACT

The present invention relates to a method for monitoring, wherein the sample injector comprises a sample storage portion and a volume displacement device. The method comprises obtaining a pressure characteristic indicative for a pressure of the sample storage portion. In addition, the method comprises obtaining a displacement characteristic indicative for a displacement volume of the volume displacement device, when the volume displacement device is fluidically connected to the sample storage portion. Based on the obtained pressure characteristic and the obtained measured displacement characteristic the method comprises determining at least one result. In addition, the present invention relates to a sample injector, sample injector system and a system configured to carry out the method.

66 Claims, 19 Drawing Sheets

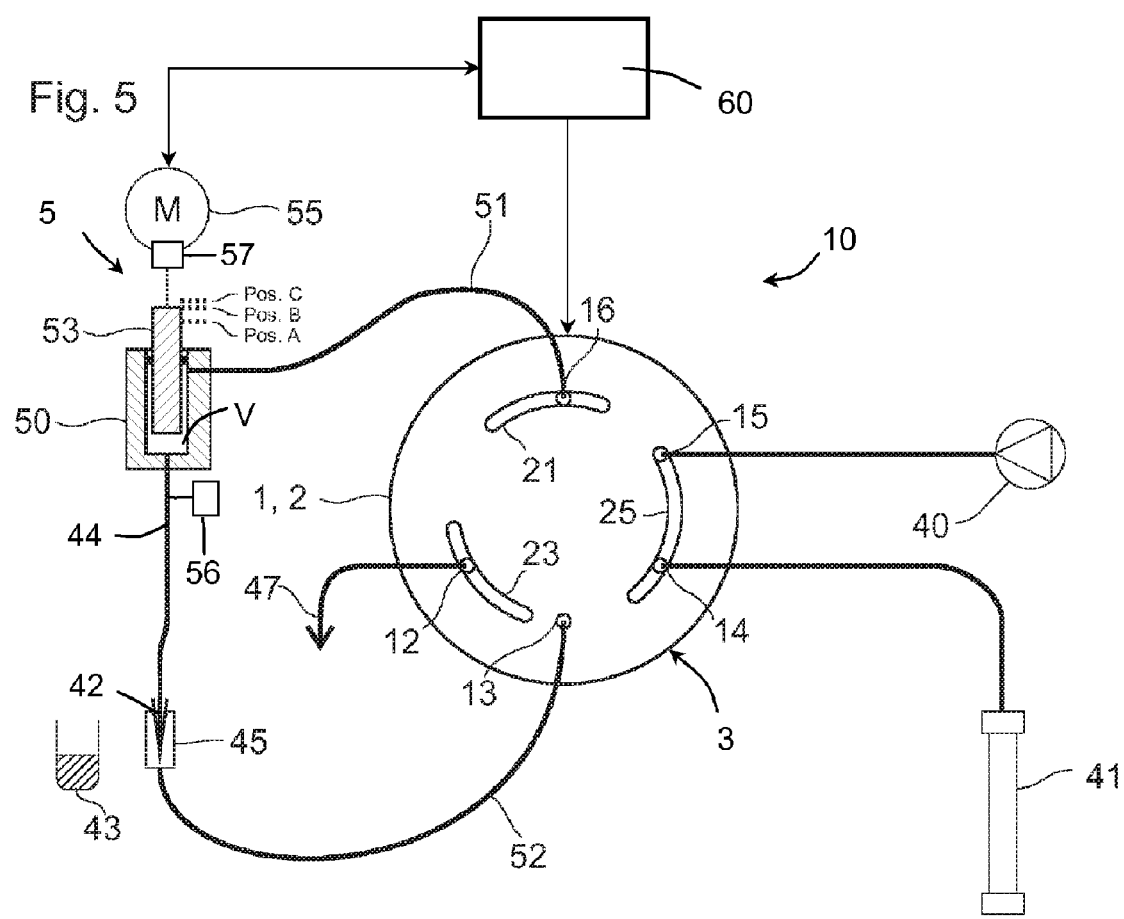

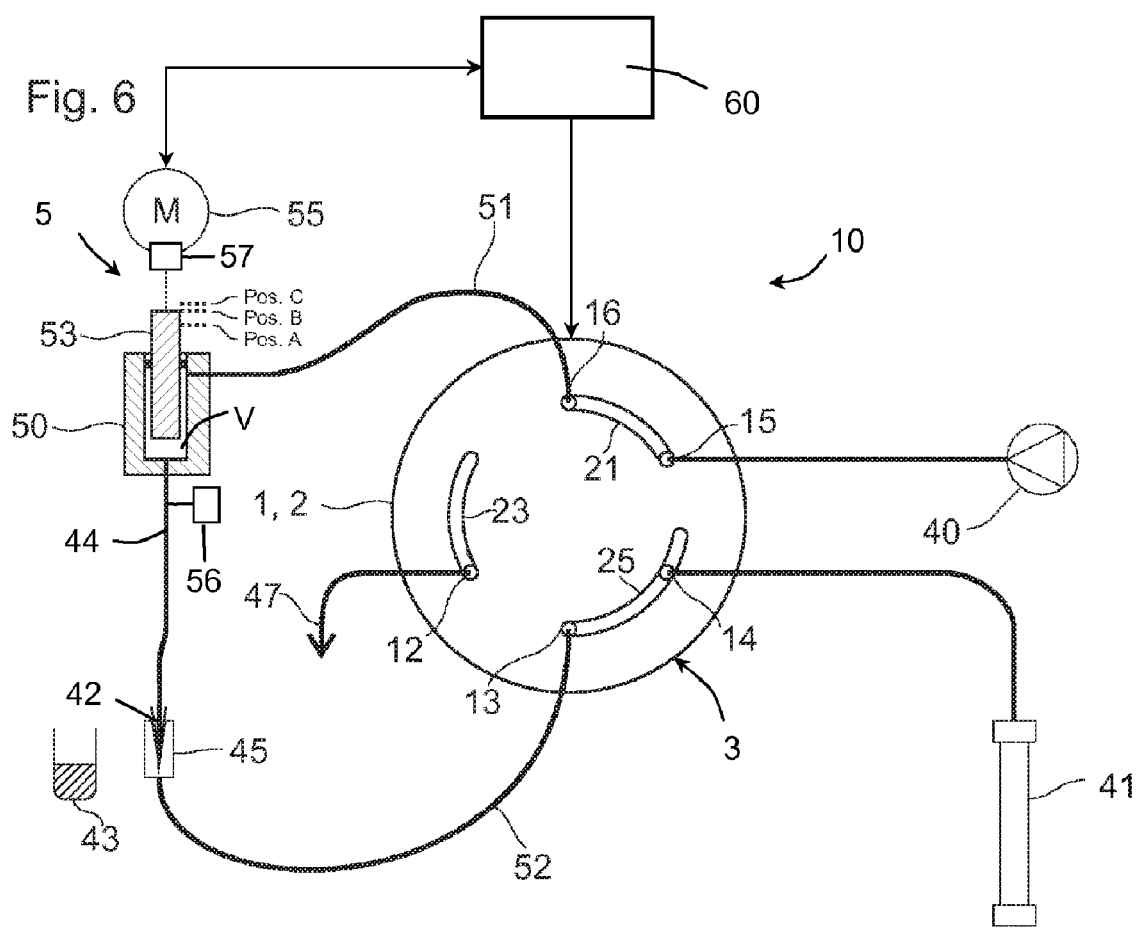

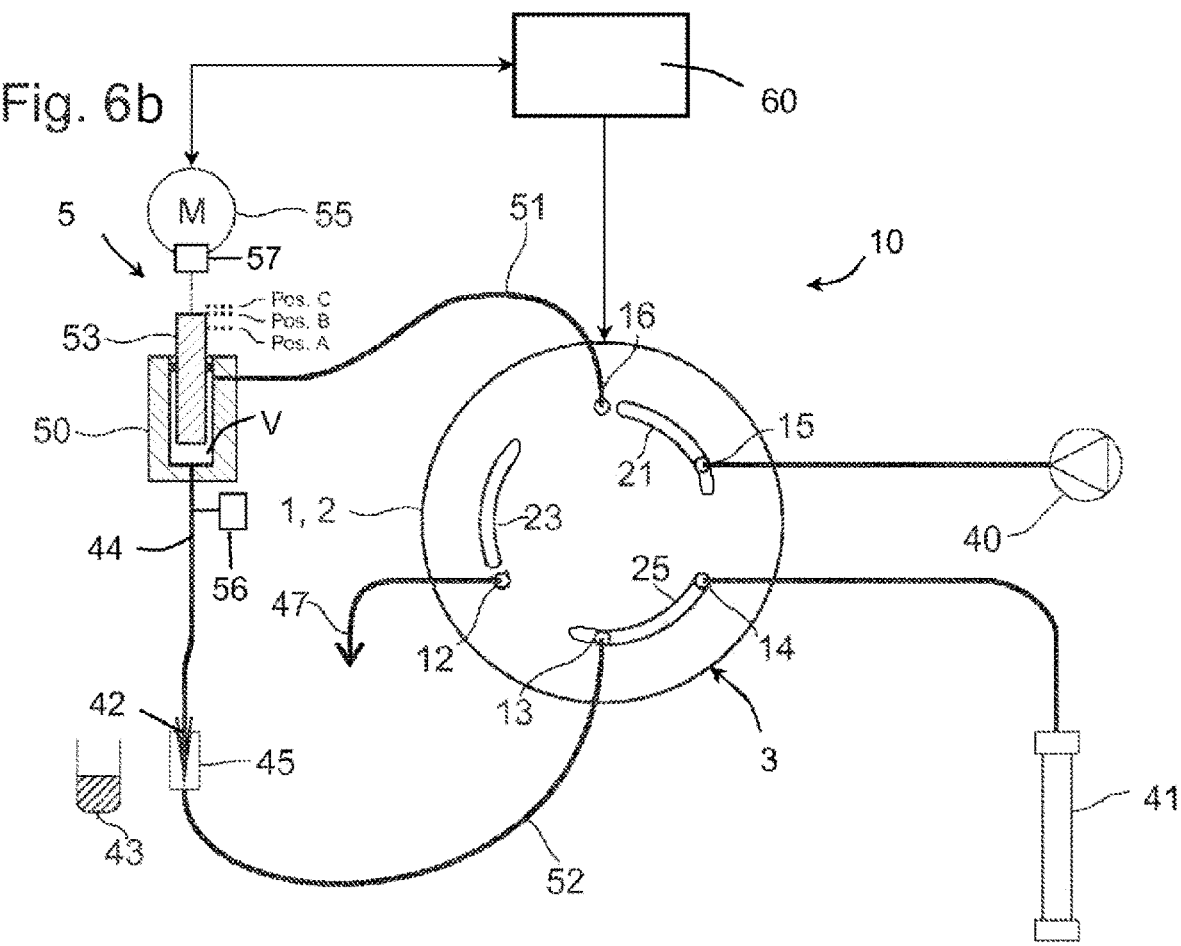

| | $\frac{\Delta D}{\Delta t} = \frac{-\Delta V}{\Delta t}$ | $\frac{\Delta P}{\Delta t}$ | Result | # |
|---|---|---|---|---|
| No Pressure Regulation | 0 | 0 | No leakage and no temperature change | 1 |
| | 0 | Positive | Input leakage and/or temperature rise | 2 |
| | 0 | Negative | Output leakage and/or temperature drop | 3 |
| Pressure Regulation | 0 | 0 | No leakage and no temperature change | 4 |
| | Positive | 0 | Output leakage and/or temperature drop | 5 |
| | Negative | 0 | Input leakage and/or temperature rise | 6 |

Fig. 13

MONITORING SAMPLE INJECTORS

CROSS-REFERENCE TO RELATED APPLICATION

This application claims the priority benefit under 35 U.S.C. § 119 to German Patent Application No. DE 10 2021 100 915.4, filed on Jan. 18, 2021, the disclosure of which is incorporated herein by reference.

The present invention generally relates to the injection of a sample into a system. Embodiments of the invention lie in the field of chromatography, such as liquid chromatography (LC) and particularly in the field of samplers for High-Performance Liquid Chromatography (HPLC). HPLC is a method of separating samples into their constituent parts. The sample can be separated for subsequent use, or the portions of the sample can be detected and quantified.

LC systems are based on chromatographic separation, where a sample may be separated into a characteristic separation pattern by pumping the sample together with an elution solvent, i.e., the mobile phase, through a chromatographic column which contains a solid, i.e., a stationary phase. Analytes in the mobile phase interact with the stationary phase and depending on the intensity of interaction between the mobile phase and the stationary phase, the analytes are retained to a characteristic degree. As a result, components of the sample exit the chromatographic column (also referred to as a separation column) after different times depending on the strength of interaction, which time may be referred to as a retention time (RT). In simple words, components of a sample may be separated by means of a separation column whose content interacts differently with the different components of the sample. This determines the time that the components are retained in the separation column, which means that the RT is a characteristic for each component of a sample under given chromatographic conditions.

In HPLC, the separation of compounds can be influenced by adjusting the composition of the mobile phase over time, and by adjusting the properties of the stationary phase. For instance, the separation accuracy of the column depends on the grain size of the packing material. Even though smaller grain sizes may achieve a better separation, it may result in a large resistance within a fluidic system, which may result in a decreased throughput. To counteract this, the trend in HPLC analyses is towards ever higher pressures. As such, all components of the HPLC system must withstand these higher pressures.

In HPLC, a sampler may have the task of managing samples and introducing a defined quantity of a sample into the fluidics of a column at a defined point in time. In some instances, the sampler may use a needle which may be adapted to pick the sample up and then move it into a needle seat, which may subsequently be sealed at high pressures at a needle seat. Thereafter, a valve may switch the sample via the needle and the needle seat into the fluid path to the column.

U.S. Pat. No. 8,806,922 B2 describes a sample injector for liquid chromatography that allows to minimize pressure surges and thus flow interruptions during injection of the sample. The latter is achieved by switching of the inject valve into a pressure compensation position and subsequent pressurization of the fluid contained in the closed volume to a pressure that about matches the pressure of the pump which delivers the flow to the chromatography column. Thus, upon switching of the inject valve to the inject position only a small pressure difference exists between the sample loop and the fluidic system which contains the chromatography column. This pressure adjustment of the fluid in the sample loop can also be referred to as precompression. This small pressure difference is maintained in such way that this switching of the inject valve does not cause disadvantageous effects to the flow through the chromatography column or negative effects on the lifetime of the chromatography column and inject valve. U.S. Pat. No. 8,806,922 B2 also describes a realization of the sample injector where a pressure sensor is determining the pressure in the sample loop for pressure matching.

In other state of the art injector systems that allow for precompression there is no actual information on the pressure of the fluid in the sample loop available. The pressure for precompression is adjusted by compression of the fluid in the sample loop by moving the actuator of the injector (syringe pump) to a predefined position. However, the latter being an open loop control for pressure adjustment has several disadvantages.

Overall, there is a need for technology that monitors sample injectors. Generally, it is an object of the present invention to provide a technology further improving a sample injector and corresponding methods.

In a first aspect the present invention relates to a method for monitoring a sample injector.

The sample injector comprises a sample storage portion and a volume displacement device. For the sake of brevity, the sample storage portion can also be referred to as a storage portion and the volume displacement device as a displacement device.

Typically, the sample injector can be configured to facilitate injecting a sample into a system that the sample injector can be part of, e.g., into a chromatography system. More particularly, the sample injector can be configured to facilitate injecting a sample into a downstream device, e.g., into a chromatographic column. The sample storage portion can be configured to accommodate a fluid, e.g., the sample to be injected.

The displacement device can be configured to displace a volume. The volume displaced by the volume displacement device is referred to as a displacement volume. In at least one configuration of the sample injector, the displacement device and the sample storage portion can be fluidically connected to each other. Thus, the displacement device and the sample storage portion can define a joint volume, wherein a fluid, e.g. the sample to be injected, can be accommodated. The joint volume, i.e., the space inside the sample storage portion and the displacement device, can depend on the displacement volume. Thus, the displacement device can displace a volume to change the space inside the sample storage portion and the displacement device. In other words, the displacement device can change the volume that can be occupied by the fluid inside the sample storage portion, e.g., the sample. This can facilitate changing and/or regulating the pressure in the sample storage portion. For example, the volume displacement device can be configured to increase the pressure in the sample storage portion.

The method of the present invention comprises the step of obtaining a pressure characteristic, wherein the pressure characteristic is indicative for a pressure in the sample storage portion. In addition, the method comprises obtaining a displacement characteristic, wherein the displacement characteristic is indicative for a displacement volume of the volume displacement device, when the volume displacement device is fluidically connected to the sample storage portion. Further, the method comprises determining at least one result based on the obtained pressured characteristic and the obtained displacement characteristic.

Throughout the description, the expression "fluidically connected" and "fluidly connected" are interchangeably used.

The sample injector can be configured to facilitate injecting a sample into a system that the sample injector can be part of, e.g., into a chromatography system. Typically, the sample injection step can be of particular importance as it can affect the operation of the system. That is, an erroneous sample injection step may lead to the entire operation of the system to be erroneous, even though the rest of the operation of the system may be accurately performed. For example, in a chromatography system, the sample injection step (facilitated by the sample injector) can affect the results of the chromatographic analysis, even though the analysis is performed correctly. Hence, errors during sample injection may lead to erroneous analysis results of the sample, a waste of system resources, energy and time. Moreover, the sample injection step can be a particularly error-prone process. Some errors that may occur include injection of a wrong sample, missing sample, present of a leakage and/or blockage and erroneously compressing a fluid in the sample storage portion.

In this regard, the present invention can be particularly advantageous as it can monitor the sample injector and thus can alleviate errors that may occur during the utilization of the sample injector. This can lead to more accurate results (e.g. analytical results of the sample) and in general a more efficient operation of the sample injector and the system that the sample injector can be part of. In particular, this can be advantageous in chromatography systems wherein repeatability and robustness of the analytical routine performed by the chromatography systems is highly sought for.

The present method obtains a pressure characteristic and a displacement characteristic and based thereon can determine different results. In particular, the present method can determine the type of fluid contained in the sample storage portion, whether a sample is missing in the sample storage and/or whether a leakage or blockage is present. Again, this can be particularly advantageous for detecting errors during the operation of the sample injector, e.g., during a sample injection in a chromatography system.

Moreover, the present method can be performed during different utilizations of the sample injector, such as, while the sample injector pre-compresses a fluid in the sample storage and/or while the sample injector injects a fluid to a downstream device. That is, the present method can be advantageous as it can monitor the sample injector whenever the sample injector can be utilized.

That is, embodiments of the present technology obtain a pressure characteristic and a displacement characteristic and determine a result based on these characteristics. For example, one of the characteristics may be controlled (and thus, a data processing system may obtain this characteristic) and the other characteristic may be measured. Based thereon, at least one result may be determined. For example, it may be determined whether a compressibility following from the obtained characteristic matches an expected compressibility to a sufficient degree. If this is not the case, this may indicate, e.g., that a wrong fluid is present and/or a leak.

That is, compared to prior art systems, embodiments of the present invention may overcome the following disadvantages.

Firstly, pressure adjustment can only be valid for fluids of known compressibility. If a fluid with different compressibility would be contained in the sample loop, the pressure during precompression would not match the pressure of the pump. Such a scenario would be for instance if the syringe pump of the injector would be accidently filled with a different (incorrect) fluid. Again, while this may not be detected by prior art technologies, it may be detected by embodiments of the present invention.

Secondly, missing fluid in sample loop cannot be detected in prior art technologies. This could be caused by missing sample or missing fluid in the syringe pump. This could for example be caused by a missing or empty sample vial. Again, embodiments of the present technology allow such scenarios to be detected.

Thirdly, there may be no detection and compensation for leakages in prior art technologies. Any leakage in the sample loop would cause a pressure discrepancy during precompression. Locations of potential leakages in such an injector system are the piston seal of the syringe pump as wells as the needle and the needle seat. All of those components are subject to wear and thus could lead to leakages in a typical user scenario. Again, embodiments of the present technology allow such malfunctions to be detected.

In some embodiments, the method can comprise isolating the sample storage portion from ambient atmosphere and increasing the pressure in the sample storage portion while the sample storage portion is isolated from ambient atmosphere to a first pressure.

On the one hand, this can facilitate the operation of the sample injector. Typically, this step is performed prior to injecting the sample. Therefore, it can also be referred to as pre-compression. For example, in a chromatography system, a sample can be injected to a chromatographic column with a high pressure. Increasing the pressure in the sample storage portion (i.e. pre-compressing the sample) can facilitate matching the pressure in the sample storage portion with the high pressure that can be used to inject the sample. Thus, when the sample storage portion is fluidically connected with the fluidic path wherein the fluid is to be injected, only a small pressure difference (or, in fact, no difference) can be present between the sample storage portion and the fluidic path. This can minimize pressure surges and flow interruptions during sample injection as well as alleviate disadvantageous effects that otherwise can be caused on the sample injector and/or chromatography column.

On the other hand, increasing the pressure in the sample storage portion can facilitate the step of determining at least one result. For example, increasing the pressure can make the system more sensitive to leakages (i.e. the volumetric leakage rate can be increased as well), thus, increasing the likelihood of detecting a leakage.

Typically, in chromatography systems a pre-compression of the sample in the sample loop (i.e. sample storage portion) can be performed. This is, for example, discussed in U.S. Pat. No. 8,806,922 B2. Embodiments of the present invention may utilize the pre-compression phase to obtain a pressure characteristic and displacement characteristic and to determine at least one result based thereon. That is, it can be particularly advantageous to perform the method of the present invention during the pre-compression phase of a chromatography system, such as, the one described in the U.S. Pat. No. 8,806,922 B2.

In some embodiments, the first pressure can exceed the ambient pressure by at least 100 bar, preferably by at least 500 bar, further preferably by at least 1000 bar. This can be particularly the case in embodiments wherein the sample injector can be part of a chromatography system and particularly of HPLC systems or ultra-HPLC systems. In HPLC systems a sample is injected at a chromatographic column with a very high pressure, typically exceeding 1000 bar. As such, increasing the pressure by at least 100 bar, preferably by at least 500 bar, further preferably by at least 1000 bar can facilitate matching the pressure in the sample storage portion to the high-pressure fluidic paths of the chromatographic system.

The method can further comprise utilizing the volume displacement device for increasing the pressure in the sample storage portion. As discussed, the displacement device can displace a volume and by displacing a volume it can compress a fluid in the sample storage portion.

More particularly, the method can comprise increasing the displacement volume of the volume displacement device for increasing the pressure in the sample storage portion.

In some embodiments, the volume displacement device can enclose an internal volume of the volume displacement device. In such embodiments, increasing the displacement volume can comprise decreasing the internal volume of the volume displacement device. As such, the pressure in the internal volume of the volume displacement device can increase. Furthermore, this can be performed while the volume displacement device and the sample storage portion are fluidically connected to each other. As such, decreasing the internal volume of the volume displacement device (i.e. increasing the pressure in the internal volume of the volume displacement device) can cause an increase in the pressure of the sample storage portion.

The sample injector can be configured for fluidically connecting the sample storage portion to a fluidic path, and wherein the first pressure matches the pressure in the fluidic path.

The fluidic path can be a high-pressure fluidic path. For example, the pressure in the fluidic path may exceed the ambient pressure by at least 100 bar, preferably by at least 500 bar, further preferably by at least 1000 bar.

The fluidic path can comprise at least one chromatographic column. That is, the sample injector can be configured to facilitate injecting a sample into the chromatographic column.

As discussed, the method can be performed during different utilizations of the sample injector.

In some embodiments, the pressure characteristic and the displacement characteristic can be obtained while increasing the pressure in the sample storage portion to the first pressure. In other words, the method can comprise performing the steps of obtaining the pressure characteristic and obtaining the displacement characteristic while increasing the pressure in the sample storage portion to the first portion. Such embodiments, as discussed below, can be particularly advantageous for determining a feature, a type or a composition of the fluid in the sample storage portion, for determining whether an expected or erroneous fluid is present in the sample storage portion and/or for determining whether a fluid is missing in the sample storage portion.

In such embodiments (i.e. when the characteristics are obtained while increasing the pressure in the sample storage portion to the first pressure), the method can comprise utilizing the pressure characteristic and displacement characteristic, which are obtained while increasing the pressure in the sample storage portion to the first pressure, to determine a compressibility of a fluid in the sample storage portion, e.g., an isothermal compressibility.

In some embodiments, the method can comprise maintaining a temperature of the sample storage portion and of the volume displacement device substantially constant, while obtaining the pressure characteristic and the displacement characteristic. For example, the temperature can comprise a range of at most 10° C., preferably at most 5° C., more preferably at most 2° C. This can particularly facilitate determining the isothermal compressibility of the fluid in the sample storage portion and/or utilizing the isothermal compressibility to determine a feature of the fluid in the sample storage portion.

In some embodiments, determining the at least one result can comprise utilizing the determined compressibility to determine at least one of a phase and a composition of a fluid in the sample storage portion. Alternatively or additionally, determining the at least one result can comprise utilizing the determined compressibility to classify the fluid in the sample storage portion as one or a combination of gas, water, organic chromatography solvent and non-organic chromatography solvent. The above can be particularly advantageous for detecting the presence of an erroneous fluid in the sample storage portion.

Alternatively or additionally, determining the at least one result can comprise utilizing the determined compressibility to determine a number of different fluid types contained in the sample storage portion. For example, fluids with different compressibility can be differentiated.

Alternatively or additionally, determining the at least one result can comprise utilizing the determined compressibility to determine the presence of a gaseous media in the sample storage portion. This can facilitate detecting when a fluid, e.g., a sample, is missing in the sample storage portion.

Alternatively or additionally, determining the at least one result can comprise utilizing the determined compressibility to determine whether the sample storage portion is empty, such as filled with air. That is, it can be detected whether a process of loading the sample storage portion was successful.

In some embodiments, determining the at least one result can comprise comparing the determined compressibility to an expected value for the compressibility.

In such embodiments, the method can comprise determining, based on the comparison, whether an expected fluid is contained in the sample storage portion.

Moreover, the method can comprise providing a plurality of reference compressibilities labeled with a fluid unique ID indicative for a respective fluid composition. In other words, for each of a plurality of fluid types a respective reference compressibility can be provided. In such embodiments, determining the at least one result can comprise comparing the determined compressibility to at least one of the reference compressibilities. Based on the comparison, a match between the fluid in the sample storage portion and the plurality of fluid types for each of which a compressibility is provided can be determined. Thus, the type of the fluid in the sample storage portion can be determined. Moreover, it can be determined whether the fluid in the fluid storage portion is the expected one. Hence, the presence of an erroneous fluid in the sample storage portion can be determined.

In some embodiments, the method can comprise determining, based on the comparison with the reference compressibilities, a composition of a fluid in the sample storage portion.

In some embodiments, the pressure characteristic and the displacement characteristic can be obtained after increasing the pressure in the sample storage portion to the first pressure. In other words, the method can comprise performing the steps of obtaining the pressure characteristic and obtaining the displacement characteristic after increasing the pressure in the sample storage portion to the first portion.

Such embodiments, as discussed below, can be particularly advantageous for detecting a leakage.

In such embodiments (i.e. the pressure characteristic and the displacement characteristic can be obtained after increasing the pressure in the sample storage portion to the first pressure), determining the at least one result can comprise determining whether a leakage is present in the sample injector based on the pressure characteristic and the displacement characteristic which are obtained after increasing the pressure in the sample storage portion to the first pressure.

Determining the at least one result can comprise determining a leakage when the pressure characteristic changes while the displacement characteristic is constant or when the displacement characteristic changes while the pressure characteristic is constant.

That is, in some embodiments, the pressure in the sample storage portion may not be regulated and the displacement volume can be maintained (substantially) constant. Thus, in such conditions, ideally (i.e. no leakage present) it can be expected that both the pressure characteristic and the displacement characteristic remain constant. However, if the pressure characteristic changes while the displacement characteristic remains constant, then this can be an indicator of a leakage.

Alternatively, in some embodiments, the pressure in the sample storage portion may be regulated (i.e. maintained constant) by adjusting the displacement volume. Thus, in such conditions, ideally (i.e. no leakage present) it can be expected that both the pressure characteristic and the displacement characteristic remain constant. However, if the displacement characteristic changes (to compensate for a pressure change), then this can be an indicator of a leakage.

In some embodiments, determining the at least one result can comprise determining that the leakage is an input leakage when the pressure characteristic increases with increasing time while the displacement characteristic is constant or when the displacement characteristic decreases with increasing time while the pressure characteristic is constant.

In some embodiments, determining the at least one result comprises determining that the leakage is an output leakage when the pressure characteristic decreases with increasing time while the displacement characteristic is constant or when the displacement characteristic increases with increasing time while the pressure characteristic is constant.

In some embodiments, determining the at least one result comprises determining that no leakage is present in the sample injector when the pressure characteristic and the displacement characteristic remain constant after increasing the pressure in the sample storage portion to the first pressure.

In some embodiments, after increasing the pressure in the sample storage portion to the first pressure, the method comprises holding the pressure in the sample storage portion constant. That is, the sample injector can be configured to regulate the pressure in the sample storage portion.

In some embodiments, holding the pressure in the sample storage portion constant can comprise adjusting the displacement volume of the volume displacement device to compensate for changes in the sample storage portion.

In some embodiments, the method can comprise after increasing the pressure in the sample storage portion to the first pressure, holding the displacement characteristic of the volume displacement device constant. Typically, this can be the case when no pressure regulation is used.

In some embodiments, the method can further comprise a temperature equilibration phase after increasing the pressure in the sample storage portion to the first pressure and before obtaining the pressure characteristic and the displacement characteristic used to determine whether a leakage is present. The temperature equilibration phase can minimize the temperature changes while obtaining the characteristics after the pressure in the sample storage portion is increased to a first pressure. That is, the temperature equilibration phase can be advantageous as the temperature in the sample storage portion can go to a steady state after the increase of the pressure in the sample storage portion. Generally, obtaining the characteristics during isothermal conditions in the sample storage portion can yield more accurate results.

In addition, the temperature equilibration phase may facilitate reducing the likelihood of erroneously determining that a leakage is present (i.e. the false positive rate). Due to pressurization, the temperature in the sample storage portion can increase. After that, the temperature in the sample storage portion can decrease towards a steady state (e.g. towards ambient temperature). This can cause a decrease of the pressure in the sample storage portion. Alternatively, in case pressure regulation is performed, the decrease in temperature can cause an increase of the displacement volume. While otherwise this can be erroneously determined to be caused by a leakage, including the temperature equilibration phase can alleviate this.

The temperature equilibration phase can comprise a duration of at least 10 s and at most 120 s.

In some embodiments, the temperature equilibration phase can be performed until the temperature in the sample storage portion drops to a reference temperature, e.g., to the ambient temperature. In such embodiments, a temperature sensor can be further utilized.

During the temperature equilibration phase, the pressure characteristic and the displacement characteristic cannot be obtained. Alternatively, the pressure characteristic and the displacement characteristic obtained during the temperature equilibration phase cannot be used to determine the at least one result (i.e. are neglected).

In some embodiments, the leakage determination can comprise the determination of a leakage rate.

The leakage rate can be a volumetric leakage rate.

In such embodiments, the method can comprise providing a compressibility of a fluid in the sample storage portion and determining the leakage rate based on the provided compressibility, the change of the pressure characteristic which is obtained after increasing the pressure in the sample storage portion to the first pressure and a duration during which the pressure characteristic changes.

In embodiments wherein the compressibility of the fluid in the sample storage portion can be determined the method can comprise determining the leakage rate based on the determined compressibility, the change of the pressure characteristic which is obtained after increasing the pressure in the sample storage portion to the first pressure and a duration during which the pressure characteristic changes.

Typically, in such embodiments, to determine a leakage rate, the pressure characteristic can be obtained during at least two different times after the pressure increase in the sample storage portion.

Alternatively, the leakage rate can be determined based on the change of the displacement characteristic which is obtained after increasing the pressure in the sample storage portion to the first pressure and a duration during which the displacement characteristic changes. In such embodiments, the displacement characteristic can be obtained during at least two different times after the pressure increase in the sample storage portion.

In such embodiments, the leakage rate can be determined by determining a difference between the maximum and minimum of the displacement characteristic which is obtained after increasing the pressure in the sample storage portion to the first pressure. Next a duration during which the displacement characteristic changes from minimum to maximum can be determined. Then, the leakage rate can be determined by dividing the determined difference with the determined duration.

In some embodiments, wherein the sample injector can be configured for fluidically connecting the sample storage portion to a fluidic path, the method can comprise fluidically connecting the sample storage portion to the fluidic path.

In such embodiments, the pressure characteristic and the displacement characteristic can be obtained after fluidically connecting the sample storage portion to the fluidic path. That is, in some embodiments, the method can comprise obtaining the pressure characteristic and the displacement characteristic after fluidically connecting the sample storage portion to the fluidic path. This can be particularly advantageous for detecting leakages and/or blockages while injecting the fluid from the sample storage portion to the fluidic path.

In such embodiments, the method can comprise providing an expected flow rate and/or a feature indicative for the expected flow rate of the fluidic path. The expected flow rate of the fluidic path can depend, inter alia, on the fluidic resistance of the fluidic path. Thus, in some embodiments, the method can comprise calculating the expected flow path based on the fluidic resistance of the fluidic path. Moreover, the fluidic resistance of the fluidic path can depend, inter alia, on the geometries, temperature, the fluid and the materials of the components of the fluidic path. Based thereon, the method can comprise determining the expected flow rate.

In such embodiments, determining the at least one result can comprise determining whether a leakage or blockage can be present in the sample injector and/or in the fluidic path. This determination can be performed based on the expected flow rate and/or the feature indicative for the expected flow rate of the fluidic path and based on the pressure characteristic and the displacement characteristic which are obtained after fluidically connecting the sample storage portion to the fluidic path.

In some embodiments, the method can comprise determining a fluid output rate from the sample storage portion based on the pressure characteristic and the displacement characteristic which are obtained after fluidically connecting the sample storage portion to the fluidic path.

In such embodiments, determining the at least one result can comprise determining whether a leakage or blockage is present in the sample injector and/or in the fluidic path based on the expected flow rate and/or based on the feature indicative for the expected flow rate of the fluidic path and the fluid output rate from the sample storage portion. For example, the presence of a leakage or blockage can be determined by comparing the determined fluid output rate with the expected fluid output rate.

For example, a leakage in the sample injector and/or in the fluidic path can be determined when the fluid output rate is larger than the expected flow rate. Alternatively, a blockage in the sample injector and/or in the fluidic path can be determined when the fluid output rate is smaller than the expected flow rate.

Furthermore, the method can comprise providing a compressibility of a fluid in the sample storage portion. In such embodiments, the fluid output rate from the sample storage portion can be determined based on the provided compressibility, the change of the pressure characteristic which is obtained after fluidically connecting the sample storage portion to the fluidic path and a duration during which the pressure characteristic changes.

In some embodiments (as discussed above), the compressibility of the fluid can be determined. In such embodiments, the fluid output rate from the sample storage portion can be determined based on the determined compressibility, the change of the pressure characteristic which is obtained after fluidically connecting the sample storage portion to the fluidic path and a duration during which the pressure characteristic changes.

Alternatively, the fluid output rate can be determined based on the change of the displacement characteristic which is obtained after fluidically connecting the sample storage portion to the fluidic path and a duration during which the displacement characteristic changes.

More particularly, the fluid output rate can be determined by determining a difference between the maximum and minimum of the displacement characteristic which is obtained after fluidically connecting the sample storage portion to the fluidic path. Next, a duration during which the displacement characteristic changes from minimum to maximum can be determined. Then, the fluid output rate can be determined by dividing the determined difference with the determined duration.

In some embodiments, the method can comprise determining a leakage rate after fluidically connecting the sample storage portion to the fluidic path based on a difference between the fluid output rate and expected flow rate.

In a second aspect the present invention relates to a sample injector. The sample injector can comprise the sample storage portion and the volume displacement device. Moreover, the sample injector can be configured to carry out the method according to any of the preceding method embodiments.

It will be understood that features and advantages discussed above with respect to the method are also be valid for the sample injector configured to perform the method, as discussed herein. That is, the sample injector configured to perform the method according to any of the preceding embodiments, can comprise any of the technical effects of the method.

The volume displacement device can be configured to generate a pressure difference.

The volume displacement device can be configured to generate the pressure difference in the sample storage portion when fluidically connected to the sample storage portion.

The volume displacement device can comprise a housing and a movable element, wherein the movable element can be configured to move inside the housing. That is, the movable element can be configured to displace the volume inside the housing.

The volume displacement device can be configured to generate the pressure difference via a movement of the movable element.

The volume displacement device can be configured to obtain a position and/or a feature indicative for the position of the movable element inside the housing. This can facilitate obtaining the displacement characteristic. For example, the displacement characteristic can comprise a position and/or a feature indicative for the position of the movable element inside the housing.

The volume displacement device can comprise a cavity which can be at least partially enclosed by the housing and the movable element. The volume displacement device can be configured to displace a volume in the cavity, via a movement of the movable element to generate the pressure difference.

The volume displacement device can be configured to obtain the displacement characteristic indicative for the displacement volume of the volume displacement device.

The volume displacement device can comprise a drive operatively connected to the movable element and configured to change a position of the movable element inside the housing. This can facilitate automatically controlling and operating the volume displacement device. Additionally, this can facilitate obtaining the displacement characteristic based on the control of the volume displacement device.

In such embodiments, the displacement characteristic can comprise an activation time of the drive and/or an amount of actuation generated by the drive. Such data can be used, e.g., to calculate the position of the position of the movable element inside the housing and/or the displacement volume.

The drive can comprise a motor, such as a stepper motor, and the displacement characteristic comprises a number of rotations generated by the motor. Again, the number of rotations generated by the motor can be used, e.g., to calculate the position of the position of the movable element inside the housing and/or the displacement volume.

The sample injector can further comprise a sensor device configured to measure a pressure and/or a feature indicative for the pressure in the sample storage portion.

It will be understood the sensor device can also be provided separately from the sample injector. In any case, the following features of sensor device hold.

The sensor device can comprise at least one pressure sensor configured to measure the pressure in the sample storage portion. In such embodiments, the sensor device can be configured to perform a direct measurement of the pressure in the sample storage portion.

Alternatively, the sensor device can be configured to indirectly measure the pressure in the sample storage portion and/or to measure a feature indicative for the pressure in the sample storage portion.

For example, the sensor device can comprise at least one electricity meter configured to measure a power consumption or a feature indicative for a power consumption of the volume displacement device. Typically, the electrical power required by the volume displacement device to displace a volume can depend on the pressure in the sample storage portion, when the volume displacement device is fluidically connected to the sample storage portion. Thus, based on the at least one electricity meter, the pressure characteristic (e.g., the pressure in the sample storage portion) can be obtained.

The sensor device can comprise at least one force sensor configured to measure a force exerted on the volume displacement device from fluid(s) contained in the sample storage portion. Similarly as above, the force exerted on the volume displacement device from fluid(s) contained in the sample storage portion can depend on the pressure in the sample storage portion. Thus, based on the at least one force sensor, the pressure characteristic (e.g., the pressure in the sample storage portion) can be obtained.

Moreover, the sample injector can comprise a data processing system.

It will be understood the data processing system can also be provided separately from the sample injector. In any case, the following features of the data processing system hold.

The data processing system can be operatively connected to the volume displacement device and can be configured to control the volume displacement device.

The data processing system can be configured to control the movement of the movable element.

More particularly, the data processing system can be configured to control the drive.

In some embodiments, by controlling the volume displacement device, the data processing system can be configured to obtain the displacement characteristic.

Moreover, the data processing system can be operatively connected to the sensor device and can be configured to control the sensor device.

The data processing system can further be configured to obtain the pressure characteristic.

The data processing system can be configured to determine the at least one result based on the obtained pressure characteristic and the obtained displacement characteristic. That is, the data processing system can be configured to carry out the method (or at least some steps of the method) discussed above, to determine the at least one result.

In a further aspect, the present invention relates to a sample injector system. The sample injector can be configured to carry out the method according to any of the preceding method embodiments. Moreover, the sample injector system comprises the sample injector (as discussed above), a data processing system and a sensor device.

That is, the sensor device and/or the data processing system can be provided as an integral part of the sample injector or separately from the sample injector. Alternatively, there can also be hybrid embodiments. It will be understood that the data processing system and the sensor device of the system can comprise same functionalities with the data processing system and the sensor device discussed with respect to the sample injector embodiments.

Furthermore, it will be understood that features and advantages discussed above with respect to the method and the sample injector can also be valid for the sample injector system configured to perform the method. That is, the sample injector system comprising the sample injector and configured to perform the method according to any of the preceding embodiments, can comprise any of the technical effects of the method and of the sample injector.

In a further aspect, the present invention can relate to a system, such as a chromatography system. The system comprises the sample injector according to any of the preceding sample injector embodiments or the sample injector system according to any of the preceding sample injector system embodiments. In addition, the system comprises a fluidic path. The system is configured to allow a fluid connection between the sample injector and the fluidic path.

The fluidic path can be a high-pressure fluidic path.

The pressure in the fluidic path may exceed the ambient pressure by at least 100 bar, preferably by at least 500 bar, further preferably by at least 1000 bar.

The fluidic path can comprise at least one chromatographic column.

The fluidic path can comprise at least one high-pressure pump.

The high-pressure pump can be configured to push a fluid toward the at least one chromatographic column with a high pressure.

The system can comprise at least one further fluidic path, wherein the system can be configured to allow a fluid connection between the sample injector and the at least one further fluidic path.

The at least one further fluidic path can be a low-pressure fluidic path.

The pressure in the at least one further fluidic path can be within a range of 10 bar with respect to ambient pressure, preferably within a range of 5 bar, such as within a range of 1 bar.

One of the at least one further fluidic paths can comprise a waste container.

One of the at least one further fluidic paths can comprise a washing solvent container.

It will be understood that the fluidic path and the at least one further fluidic path may further comprise tubings (e.g. capillaries) and connectors for realizing fluid connections.

The system can further comprise at least one injection valve.

The injection valve can be an integral part of the sample injector.

The injection valve can be configured to facilitate fluidically connecting the sample injector to the fluidic path.

The injection valve can comprise a LOAD configuration configured to allow loading a fluid in the sample storage portion.

The injection valve comprises a PRESSURE COMPENSATION configuration configured to allow increasing a pressure in the sample storage portion to a first pressure.

The injection valve can comprise an INJECT configuration configured to allow injecting a fluid in the sample storage portion to the fluidic path.

The system can be configured to carry out the method according to any of the preceding method embodiments. It will be understood that features and advantages discussed above with respect to the method are also valid for the system configured to perform the method. That is, the system configured to perform the method according to any of the preceding embodiments, can comprise any of the technical effects of the method.

Below further method embodiments with be discussed.

In some method embodiments, wherein the sample injector can comprise a sensor device can configured to measure a pressure and/or a feature indicative for the pressure in the sample storage portion, obtaining the pressure characteristic can comprises utilizing the sensor device to measure a pressure and/or a feature indicative for the pressure in the sample storage portion.

Again, the sensor device can be provided integral or separate from the sample injector.

In some embodiments of the method, the volume displacement device of the sample injector can comprise a moveable element and housing, wherein the movable element can be configured to move inside the housing. Moreover, the volume displacement device can be configured to obtain a position and/or a feature indicative for the position of the movable element inside the housing. In such embodiments, the method step of obtaining the displacement characteristic can comprise obtaining a position and/or a feature indicative for the position of the movable element inside the housing.

In some embodiments of the method, the sample injector can comprise a data processing system. Again, the data processing system can be provided integral or separate from the sample injector.

In such embodiments, the method can comprise providing the pressure characteristic and the displacement characteristic to the data processing system.

It will be understood that the data processing system may obtain the pressure characteristic and the displacement characteristic while controlling the sensor device and/or the volume displacement device. For example, one of the characteristics may be controlled (and thus, the data processing system may obtain this characteristic) and the other characteristic may be measured.

Further, in such embodiments, the method can comprise the data processing system determining the at least one result based on the obtained pressure characteristic and the obtained displacement characteristic.

That is, in some embodiments, the method can be a computer implemented method.

In a further aspect, the present invention relates to a computer program product comprising instructions, which when the program is executed by a computer can cause the computer to control at least one of the sample injector according to any of the preceding sample injector embodiments, the sample injector system according to any of the preceding sample injector system embodiments, the system according to any of the preceding system embodiments and to carry out the method according to any of the preceding method embodiments.

In some embodiments the computer can comprise the data processing system.

In a further aspect, the present invention relates to a computer-readable storage medium comprising instructions, which when the instructions are executed by a computer can cause the computer to control at least one of the sample injector according to any of the preceding sample injector embodiments, the sample injector system according to any of the preceding sample injector system embodiments, the system according to any of the preceding system embodiments and to carry out the method according to any of the preceding method embodiments.

In some embodiments the computer comprises the data processing system.

In a further aspect, the present invention relates to the use of the method according to any of the preceding embodiments for monitoring a sample injector.

In a further aspect, the present invention relates to the use of the method according to any of the preceding embodiments for monitoring a sample injector in a chromatography system.

In a further aspect, the present invention relates to the use of the method according to any of the preceding embodiments for monitoring a sample injector in a liquid chromatography system.

The present technology is also defined by the following numbered embodiments.

Below, method will be discussed. These embodiments are abbreviated by the letter "M" followed by a number. When reference is herein made to method embodiments, these embodiments are meant.

M1. A method for monitoring a sample injector (10) comprising a sample storage portion and a volume displacement device (5), the method comprising obtaining a pressure characteristic indicative for a pressure in the sample storage portion;

obtaining a displacement characteristic indicative for a displacement volume of the volume displacement device, when the volume displacement device is fluidically connected to the sample storage portion; and determining at least one result based on the obtained pressure characteristic and the obtained displacement characteristic.

M2. The method according to the preceding embodiment, wherein the method comprises isolating the sample storage portion from ambient atmosphere, increasing the pressure in the sample storage portion while the sample storage portion is isolated from ambient atmosphere to a first pressure.

M3. The method according to the preceding embodiment, wherein the first pressure exceeds the ambient pressure by at least 100 bar, preferably by at least 500 bar, further preferably by at least 1000 bar.

M4. The method according to any of the 2 preceding embodiments, wherein the method comprises utilizing the volume displacement device for increasing the pressure in the sample storage portion.

M5. The method according to the preceding embodiment, wherein the method comprises increasing the displacement volume of the volume displacement device for increasing the pressure in the sample storage portion.

M6. The method according to the preceding embodiment, wherein the volume displacement device encloses an internal volume of the volume displacement device and wherein increasing the displacement volume comprises decreasing the internal volume of the volume displacement device.

M7. The method according to any of the 5 preceding embodiments, wherein the sample injector (10) is configured for fluidically connecting the sample storage portion to a fluidic path, and wherein the first pressure matches the pressure in the fluidic path.

M8. The method according to the preceding embodiment, wherein the fluidic path is a high-pressure fluidic path.

M9. The method according to any of the 2 preceding embodiments, wherein the fluidic path comprises at least one chromatographic column.

M10. The method according to any of the preceding embodiments, and with the features of embodiment M2, wherein the pressure characteristic and the displacement characteristic are obtained while increasing the pressure in the sample storage portion to the first pressure.

M11. The method according to the preceding embodiment, wherein determining the at least one result comprises utilizing the pressure characteristic and displacement characteristic, which are obtained while increasing the pressure in the sample storage portion to the first pressure, to determine a compressibility of a fluid in the sample storage portion.

M12. The method according to the preceding embodiment, wherein determining the compressibility of a fluid in the sample storage portion comprises determining an isothermal compressibility of a fluid in the sample storage portion.

M13. The method according to any of the preceding embodiments, wherein the method comprises maintaining a temperature of the sample storage portion and of the volume displacement device substantially constant, while obtaining the pressure characteristic and the displacement characteristic, such that, the temperature comprises a range of at most 10° C., preferably at most 5° C., more preferably at most 2° C.

M14. The method according to any of the preceding 3 embodiments, wherein determining the at least one result comprises utilizing the determined compressibility to determine at least one of a phase and a composition of a fluid in the sample storage portion.

M15. The method according to any of the 4 preceding embodiments, wherein determining the at least one result comprises utilizing the determined compressibility to classify the fluid in the sample storage portion as one or a combination of gas, water, organic chromatography solvent and non-organic chromatography solvent.

M16. The method according to any of the 5 preceding embodiments, wherein determining the at least one result comprises utilizing the determined compressibility to determine a number of different fluid types contained in the sample storage portion.

For example, fluids with different compressibility can be differentiated.

M17. The method according to any of the 6 preceding embodiments, wherein determining the at least one result comprises utilizing the determined compressibility to determine the presence of a gaseous media in the sample storage portion.

M18. The method according to any of the 7 preceding embodiments, wherein determining the at least one result comprises utilizing the determined compressibility to determine whether the sample storage portion is empty, such as filled with air.

That is, it can be detected whether a process of loading the sample storage portion was successful.

M19. The method according to any of the preceding embodiments and with the features of embodiment M11, wherein determining the at least one result comprises comparing the determined compressibility to an expected value for the compressibility.

M20. The method according to the preceding embodiment, wherein the method comprises determining, based on the comparison, whether an expected fluid is contained in the sample storage portion.

M21. The method according to any of the preceding embodiments and with the features of embodiment M11, wherein the method comprises providing a plurality of reference compressibilities labeled with a fluid unique ID indicative for a respective fluid composition, and wherein determining the at least one result comprises comparing the determined compressibility to at least one of the reference compressibilities.

M22. The method according to the preceding embodiment, wherein the method comprises determining, based on the comparison with the reference compressibilities, a composition of a fluid in the sample storage portion.

M23. The method according to any of the preceding embodiments and with the features of embodiment M2, wherein the pressure characteristic and the displacement characteristic are obtained after increasing the pressure in the sample storage portion to the first pressure.

M24. The method according to the preceding embodiment, wherein determining the at least one result comprises determining whether a leakage is present in the sample injector (10) based on the pressure characteristic and the displacement characteristic which are obtained after increasing the pressure in the sample storage portion to the first pressure.

M25. The method according to any of the 2 preceding embodiment, wherein determining the at least one result comprises determining a leakage when the pressure characteristic changes while the displacement characteristic is constant or the displacement characteristic changes while the pressure characteristic is constant.

M26. The method according to the preceding embodiment, wherein determining the at least one result comprises determining that the leakage is an input leakage when the pressure characteristic increases with increasing time while the displacement characteristic is constant or the displacement characteristic decreases with increasing time while the pressure characteristic is constant.

M27. The method according to any of the 2 preceding embodiments, wherein determining the at least one result comprises determining that the leakage is an output leakage when the pressure characteristic decreases with increasing time while the displacement characteristic is constant or the displacement characteristic increases with increasing time while the pressure characteristic is constant.

M28. The method according to any of the 3 preceding embodiments, wherein determining the at least one result comprises determining that no leakage is present in the sample injector (10) when the pressure characteristic and the displacement characteristic remain constant after increasing the pressure in the sample storage portion to the first pressure.

M29. The method according to any of the preceding method embodiments with the features of embodiment M2, wherein the method comprises after increasing the pressure in the sample storage portion to the first pressure, holding the pressure in the sample storage portion constant.

That is, the sample injector (10) can be configured for pressure regulation.

M30. The method according to the preceding embodiment, wherein holding the pressure in the sample storage portion constant comprises adjusting the displacement volume of the volume displacement device to compensate for changes in the sample storage portion.

M31. The method according to any of the preceding method embodiments with the features of embodiments M2, wherein the method comprises after increasing the pressure in the sample storage portion to the first pressure, holding the displacement characteristic of the volume displacement device constant.

M32. The method according to any of the preceding method embodiments with the features of embodiment M24, wherein the method further comprises a temperature equilibration phase after increasing the pressure in the sample storage portion to the first pressure and before obtaining the pressure characteristic and the displacement characteristic used to determine whether a leakage is present.

M33. The method according to the preceding embodiment, wherein the temperature equilibration phase comprises a duration of at least 10 s and at most 120 s.

M34. The method according to the preceding embodiment, wherein the pressure characteristic and the displacement characteristic are not obtained during the temperature equilibration phase or the pressure characteristic and the displacement characteristic obtained during the temperature equilibration phase are not used to determine the at least one result.

M35. The method according to any of the preceding method embodiments and with the features of embodiment M25, wherein the leakage determination comprises determination of a leakage rate.

M36. The method according to the preceding embodiment, wherein the leakage rate is a volumetric leakage rate.

M37. The method according to any of the 2 preceding embodiments, wherein the method comprises providing a compressibility of a fluid in the sample storage portion and wherein the leakage rate is determined based on the provided compressibility and the change of the pressure characteristic which is obtained after increasing the pressure in the sample storage portion to the first pressure and a duration during which the pressure characteristic changes.

M38. The method according to any of the 3 preceding embodiments, and with the features of embodiment M11, wherein the leakage rate is determined based on the determined compressibility and the change of the pressure characteristic which is obtained after increasing the pressure in the sample storage portion to the first pressure and a duration during which the pressure characteristic changes.

M39. The method according to any of the 4 preceding embodiments, wherein the leakage rate is determined based on the change of the displacement characteristic which is obtained after increasing the pressure in the sample storage portion to the first pressure and a duration during which the displacement characteristic changes.

M40. The method according to any of the 5 preceding embodiments, wherein the leakage rate is determined by determining a difference between the maximum and minimum of the displacement characteristic which is obtained after increasing the pressure in the sample storage portion to the first pressure and determining a duration during which the displacement characteristic changes from minimum to maximum and dividing the determined difference with the determined duration.

M41. The method according to any of the preceding embodiments and with the features of embodiment M7, wherein the method comprises fluidically connecting the sample storage portion to the fluidic path.

M42. The method according to the preceding embodiment and with the features of embodiment M2, wherein the pressure characteristic and the displacement characteristic are obtained after fluidically connecting the sample storage portion to the fluidic path.

M43. The method according to any of the 2 preceding embodiments, wherein the method comprises providing an expected flow rate and/or a feature indicative for the expected flow rate of the fluidic path.

M44. The method according to the preceding embodiment, wherein determining the at least one result comprises determining whether a leakage or blockage is present in the sample injector (10) and/or in the fluidic path based on the expected flow rate and/or the feature indicative for the expected flow rate of the fluidic path and the pressure characteristic and the displacement characteristic which are obtained after fluidically connecting the sample storage portion to the fluidic path.

M45. The method according to any of the 3 preceding embodiments, wherein the method comprises determining a fluid output rate from the sample storage portion based on the pressure characteristic and the displacement characteristic which are obtained after fluidically connecting the sample storage portion to the fluidic path.

M46. The method according to the preceding embodiment and with the features of embodiment M43, wherein determining the at least one result comprises determining whether a leakage or blockage is present in the sample injector (10) and/or in the fluidic path based on the expected flow rate and/or the feature indicative for the expected flow rate of the fluidic path and the fluid output rate from the sample storage portion.

M47. The method according to the preceding embodiment, wherein a leakage in the sample injector (10) and/or in the fluidic path is determined when the fluid output rate is larger than the expected flow rate and a blockage in the sample injector (10) and/or in the fluidic path is determined when the fluid output rate is smaller than the expected flow rate.

M48. The method according to any of the 3 preceding embodiments, wherein the method comprises providing a compressibility of a fluid in the sample storage portion and wherein the fluid output rate from the sample storage portion is determined based on the provided compressibility and the change of the pressure characteristic which is obtained after fluidically connecting the sample storage portion to the fluidic path and a duration during which the pressure characteristic changes.

M49. The method according to any of the 4 preceding embodiments and with the features of embodiment M11, wherein the fluid output rate from the sample storage portion is determined based on the determined compressibility and the change of the pressure characteristic which is obtained after fluidically connecting the sample storage portion to the fluidic path and a duration during which the pressure characteristic changes.

M50. The method according to any of the 5 preceding embodiments, wherein the fluid output rate is determined based on the change of the displacement characteristic which is obtained after fluidically connecting the sample storage portion to the fluidic path and a duration during which the displacement characteristic changes.

M51. The method according to any of the 6 preceding embodiments, wherein the fluid output rate is determined by determining a difference between the maximum and minimum of the displacement characteristic which is obtained after fluidically connecting the sample storage portion to the fluidic path and determining a duration during which the displacement characteristic changes from minimum to maximum and dividing the determined difference with the determined duration.

M52. The method according to any of the preceding embodiments and with the features of embodiment M44 and/or M46, wherein the method comprises determining a leakage rate after fluidically connecting the sample storage portion to the fluidic path based on a difference between the fluid output rate and expected flow rate.

M53. The method according to any of the preceding embodiments, wherein obtaining a pressure characteristic comprises measuring a pressure or a feature indicative for the pressure in the sample storage portion (7).

M54. The method according to any of the preceding embodiments, wherein obtaining a pressure characteristic comprises utilizing a sensor device (56), such as, at least one of pressure sensor, electricity meter and force sensor.

M55. The method according to any of the preceding embodiments, wherein obtaining a displacement characteristic comprises measuring a position of the volume displacement device (5).

M56. The method according to any of the preceding embodiments, wherein obtaining a displacement characteristic is based on a controlling of the volume displacement device (5).

Below, sample injector embodiments will be discussed. These embodiments are abbreviated by the letter "D" followed by a number. When reference is herein made to sample injector embodiments, these embodiments are meant.

D1. A sample injector (10), wherein the sample injector (10) is configured to carry out the method according to any of the preceding method embodiments, wherein the sample injector comprises the sample storage portion (7) and the volume displacement device (5).

D2. The sample injector (10) according to the preceding embodiment, wherein the volume displacement device (5) is configured to generate a pressure difference.

D3. The sample injector (10) according to the preceding embodiment, wherein the volume displacement device (5) is configured to generate the pressure difference in the sample storage portion (7) when fluidically connected to the sample storage portion (7).

D4. The sample injector (10) according to any of the preceding sample injector embodiments, wherein the volume displacement device (5) comprises a housing (50) and a movable element (53), wherein the movable element (53) is configured to move inside the housing (50).

D5. The sample injector (10) according to the 3 preceding embodiments, wherein the volume displacement device (5) is configured to generate the pressure difference via a movement of the movable element (53).

D6. The sample injector (10) according to the preceding embodiment, wherein the volume displacement device (5) is configured to obtain a position and/or a feature indicative for the position of the movable element (53) inside the housing (50).

D7. The sample injector (10) according to any of the 2 preceding embodiments, wherein the volume displacement device (5) comprises a cavity which is at least partially enclosed by the housing (50) and the movable element (53) and wherein the volume displacement device (5) is configured to displace a volume in the cavity, via a movement of the movable element (53) to generate the pressure difference.

D8. The sample injector (10) according to any the preceding embodiment, wherein the volume displacement device (5) is configured to obtain the displacement characteristic indicative for the displacement volume of the volume displacement device (5).

D9. The sample injector (10) according to the preceding embodiment and with the features of embodiment D6, wherein the displacement characteristic comprises
the position and/or the feature indicative for the position of the movable element (53) inside the housing (50).

D10. The sample injector (10) according to any of the preceding sample injector embodiments, and with the features of embodiment D4, wherein the volume displacement device (5) comprises a drive (55) operatively connected to the movable element (53) and configured to change a position of the movable element (53) inside the housing (50).

D11. The sample injector (10) according to the preceding embodiment and with the features of embodiment D8, wherein the displacement characteristic comprises
an activation time of the drive (55) and/or
an amount of actuation generated by the drive (55).

D12. The sample injector (10) according to the preceding embodiment, wherein the drive (55) comprises a motor, such as a stepper motor, and the displacement characteristic comprises a number of rotations generated by the motor.

D13. The sample injector (10) according to any of the preceding sample injector embodiments, further comprising a sensor device (56) configured to measure a pressure and/or a feature indicative for the pressure in the sample storage portion (7).

It will be understood the sensor device can also be provided separately from the sample injector (e.g. see embodiment E1). In any case, the following features of sensor device hold.

D14. The sample injector (10) according to the preceding embodiment, wherein the sensor device (56) comprises at least one pressure sensor configured to measure the pressure in the sample storage portion (7).

D15. The sample injector (10) according to any of the 2 preceding embodiments, wherein the sensor device (56) comprises at least one electricity meter configured to measure a power consumption or a feature indicative for a power consumption of the volume displacement device (5).

D16. The sample injector (10) according to any of the 3 preceding embodiments, wherein the sensor device (56) comprises at least one force sensor configured to measure a force exerted on the volume displacement device (5) from fluid(s) contained in the sample storage portion (7).

D17. The sample injector (10) according to any of the preceding sample injector embodiments, wherein the sample injector (10) comprises a data processing system (60).

It will be understood the data processing system can also be provided separately from the sample injector (e.g. see embodiment E1). In any case, the following features of the data processing system hold.

D18. The sample injector (10) according to the preceding embodiment, wherein the data processing system (60) is operatively connected to the volume displacement device (5) and is configured to control the volume displacement device (5).

D19. The sample injector (10) according to the preceding embodiment and with the features of embodiment D4, wherein the data processing system (60) is configured to control the movement of the movable element (53).

D20. The sample injector (10) according to the preceding embodiment and with the features of embodiment D10, wherein the data processing system (60) is configured to control the drive (55).

D21. The sample injector (10) according to any of the 4 preceding embodiments, wherein the data processing system (60) is configured to obtain the displacement characteristic.

D22. The sample injector (10) according to any of the 5 preceding embodiments and with the features of embodiment D13, wherein the data processing system (60) is operatively connected to the sensor device (56) and is configured to control the sensor device (56).

D23. The sample injector (10) according to any of the 6 preceding embodiments, wherein the data processing system (60) is configured to obtain the pressure characteristic.

D24. The sample injector (10) according to the preceding embodiment and with the features of embodiment D21, wherein the data processing system (60) is configured to determine the at least one result based on the obtained pressure characteristic and the obtained displacement characteristic.

Below, sample injector system embodiments will be discussed. These embodiments are abbreviated by the letter "E" followed by a number. When reference is herein made to sample injector system embodiments, these embodiments are meant.

E1. A sample injector system, wherein the sample injector is configured to carry out the method according to any of the preceding method embodiments, wherein the sample injector system comprises
the sample injector (10) according to any of the preceding embodiments D1 to D13,
a data processing system (60), and
a sensor device (56).

That is, the sensor device and/or the data processing system can be provided as an integral part of the sample injector (e.g. see embodiments D13 to D16 and D17 to D24) or separately from the sample injector (see embodiment E1). Alternatively, there can also be hybrid embodiments. It will be understood that the data processing system and the sensor device of embodiment E1 can comprise same functionalities with the data processing system and the sensor device discussed with respect to the sample injector embodiments.

Below, system embodiments will be discussed. These embodiments are abbreviated by the letter "S" followed by a number. When reference is herein made to system embodiments, these embodiments are meant.

S1. A system, such as a chromatography system comprising
the sample injector (10) according to any of the preceding sample injector embodiments or the sample injector system according to any of the preceding sample injector system embodiments, and
a fluidic path,
wherein the system is configured to allow a fluid connection between the sample injector (10) and the fluidic path.

S2. The system according to the preceding embodiment, wherein the fluidic path is a high-pressure fluidic path.

S3. The system according to the preceding embodiment, wherein the pressure in the fluidic path exceeds the ambient pressure by at least 100 bar, preferably by at least 500 bar, further preferably by at least 1000 bar.

S4. The system according to any of the preceding system embodiments, wherein the fluidic path comprises at least one chromatographic column.

S5. The system according to any of the preceding system embodiments, wherein the fluidic path comprises at least one high-pressure pump.

S6. The system according to the preceding embodiments, wherein the high-pressure pump is configured to push a fluid toward the at least one chromatographic column with a high pressure.

S7. The system according to any of the preceding embodiments, wherein the system comprises at least one further fluidic path, wherein the system is configured to allow a fluid connection between the sample injector (10) and the at least one further fluidic path.

S8. The system according to the preceding embodiment, wherein the at least one further fluidic path is a low-pressure fluidic path.

S9. The system according to the preceding embodiment, wherein the pressure in the at least one further fluidic path is within a range of 10 bar with respect to ambient pressure, preferably within a range of 5 bar, such as within a range of 1 bar.

S10. The system according to the preceding embodiment, wherein one of the at least one further fluidic path comprises a waste container.

S11. The system according to the preceding embodiment, wherein one of the at least one further fluidic path comprises a washing solvent container.

It will be understood that the fluidic path and the at least one further fluidic path may further comprise tubings (e.g. capillaries) and connectors for realizing fluid connections.

S12. The system according to any of the preceding system embodiments, wherein the system further comprises at least one injection valve.

S13. The system according to the preceding embodiment, wherein the injection valve is an integral part of the sample injector (10).

S14. The system according to any of the 2 preceding embodiments, wherein the injection valve is configured to facilitate fluidically connecting the sample injector (10) to the fluidic path.

S15. The system according to any of the 3 preceding embodiments, wherein the injection valve comprises a LOAD configuration configured to allow loading a fluid in the sample storage portion (7).

S16. The system according to any of the 4 preceding embodiments, wherein the injection valve comprises a PRESSURE COMPENSATION configuration configured to allow increasing a pressure in the sample storage portion (7) to a first pressure.

S17. The system according to any of the 5 preceding embodiments, wherein the injection valve comprises an INJECT configuration configured to allow injecting a fluid in the sample storage portion (7) to the fluidic path.

S18. The system according to any of the preceding system embodiments, wherein the system is configured to carry out the method according to any of the preceding method embodiments.

Below further method embodiments with be discussed.

M57. The method according to any of the preceding method embodiments,
wherein the sample injector (10) comprises the features of embodiment D13, and wherein obtaining the pressure characteristic comprises utilizing the sensor device (56) to measure a pressure and/or a feature indicative for the pressure in the sample storage portion (7).

Again, the sensor device can be provided integral or separate from the sample injector (10).

M58. The method according to any of the preceding method embodiments,
wherein the sample injector (10) comprises the features of embodiment D6, and
wherein obtaining the displacement characteristic comprises obtaining a position and/or a feature indicative for the position of the movable element (53) inside the housing (50).

M59. The method according to any of the preceding method embodiments, wherein the sample injector (10) comprises the features of embodiment D17.

Again, the data processing system can be provided integral or separate from the sample injector (10).

M60. The method according to the preceding embodiment, wherein the method comprises providing the pressure characteristic and the displacement characteristic to the data processing system (60).

It will be understood that the data processing system (60) may obtain the pressure characteristic and the displacement characteristic while controlling the sensor device (56) and/or the volume displacement device (5).

M61. The method according to the preceding embodiment, wherein the method comprises the data processing system (60) determining the at least one result based on the obtained pressure characteristic and the obtained displacement characteristic.

M62. The method according to the preceding embodiment, wherein the method is a computer implemented method.

Below, further aspects of the invention will be discussed.

C1. A computer program product comprising instructions, which when the program is executed by a computer can cause the computer
to control at least one of
the sample injector according to any of the preceding sample injector embodiments,
the sample injector system according to any of the preceding sample injector system embodiments, and
the system according to any of the preceding system embodiments
to carry out the method according to any of the preceding method embodiments.

C2. The computer program product according to the preceding embodiment, wherein the computer comprises the data processing system (60).

R1. A computer-readable storage medium comprising instructions, which when the instructions are executed by a computer can cause the computer
to control at least one of
the sample injector according to any of the preceding sample injector embodiments,
the sample injector system according to any of the preceding sample injector system embodiments, and
the system according to any of the preceding system embodiments
to carry out the method according to any of the preceding method embodiments.

R2. The computer-readable storage medium according to the preceding embodiment, wherein the computer comprises the data processing system (60).

U1. Use of the method according to any of the preceding embodiments for monitoring a sample injector (10).

U2. Use of the method according to any of the preceding embodiments for monitoring a sample injector (10) in a chromatography system.

U3. Use of the method according to any of the preceding embodiments for monitoring a sample injector (10) in a liquid chromatography system.

BRIEF DESCRIPTION OF THE DRAWINGS

FIG. 5 shows the HPLC system of FIG. 4, wherein the plunger was moved into the position B in order to realize a pressure compensation (pressure increase) in the sample loop;

FIG. 6 shows the HPLC system of FIG. 5, wherein the injection valve was changed over from the PRESSURE COMPENSATION position into the INJECT position;

FIG. 6b shows the HPLC system of FIG. 5, wherein the injection valve assumes an alternative INJECT position wherein a volume displacement device is used to inject a sample into a chromatography column;

FIG. 13 summarizes results that can be determined by monitoring the sample injector;

DETAILED DESCRIPTION OF THE DRAWING

In the following, exemplary embodiments of the invention will be described, referring to the figures. These examples are provided to give further understanding of the invention, without limiting its scope.

In the following description, a series of features and/or steps are described. The skilled person will appreciate that unless explicitly required and/or unless required by the context, the order of features and steps is not critical for the resulting configuration and its effect. Further, it will be apparent to the skilled person that irrespective of the order of features and steps, the presence or absence of time delay between steps can be present between some or all of the described steps.

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

Embodiments of the present invention relate to monitoring a device configured to facilitate sample injection. Generally, such devices can be referred to as sample injector. U.S. Pat. No. 8,806,922 B2 describes a sample injector used in liquid chromatography systems.

Figure 1A:
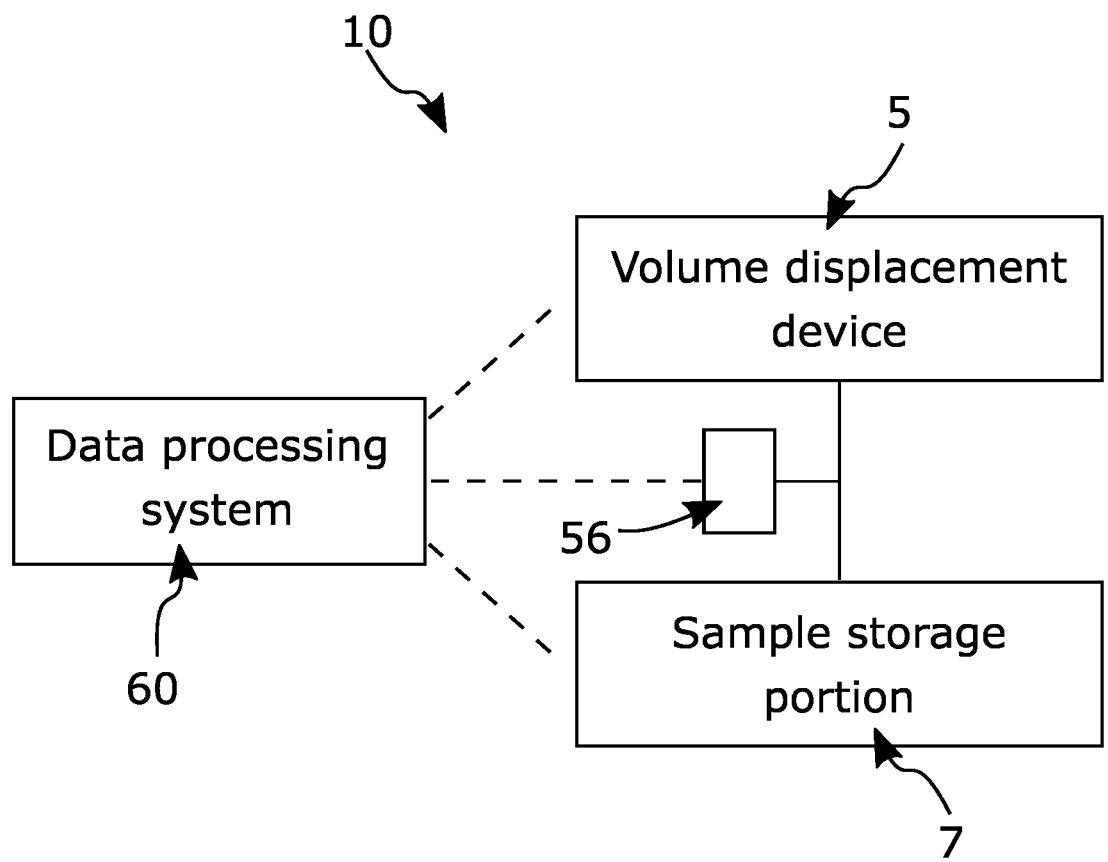
FIG. 1*a* provides a schematic that illustrates a device, which can be a sample injector, comprising a volume displacement device and a sample storage portion.

FIG. 1a provides a schematic that generally illustrates a device 10 configured to facilitate sample injection. Thus, the device 10 may also be referred to as sample injector 10. The device 10 can, for example, be used in a chromatography system for facilitating the provision of a fluid (e.g. liquid sample) to the chromatography system. For example, the device 10 can be configured for drawing a sample from a sample container (e.g. sample vial) and providing the sample to an analytical device, such as a chromatographic column.

The device 10 can comprise a volume displacement device 5 and a sample storage portion 7. For the sake of brevity, the volume displacement device 5 can also be referred to as displacement device 5 and the sample storage portion 7 as storage portion 7. The displacement device 5 can be configured to facilitate receiving a fluid and providing it to the storage portion 7. For example, the displacement device 5 can be configured for drawing a sample (e.g. a liquid sample) from a sample container. Typically, the displacement device 5 may comprise a pump volume and by adjusting the pressure in the pump volume, the displacement device may draw or eject fluid (e.g. the sample) from therein.

The displacement device 5 and the storage portion 7 can be fluidically connected to each other. In some embodiments, the device 10 can assume different configurations, wherein in at least one configuration the displacement device 5 and the storage portion 7 can be fluidically connected to each other and in at least one further configuration the displacement device 5 and the storage portion 7 can be fluidically isolated from each other. This can allow the displacement device 5 to draw a fluid from a fluid container and provide it to the storage portion 7.

When fluidically connected, the displacement device 5 and the storage portion 7 can define a combined volume which can be partly or fully occupied by a fluid (e.g. the sample). The volume displacement device 5 can be configured to displace the fluid(s) that can be contained in the combined volume defined by the displacement device 5 and the storage portion 7. More particularly, the displacement device 5 can comprise a respective internal volume, that can also be referred to as pump volume. The displacement device 5 can be configured for adjusting the pump volume. As such, the displacement device 5 can facilitate adjusting the combined volume defined by the displacement device 5 and the storage portion 7, when fluidically connected to each other. In other words, the displacement device 5 can be configured for adjusting the volume that can be occupied by the sample. If said volume is isolated from ambient atmosphere, the volume displacement device 5 can facilitate adjusting the pressure in the storage portion 7.

On the other hand, the storage portion 7 can be configured for storing a fluid, such as, the sample. The storage portion 7 can comprise an input portion (not shown) configured to facilitate providing a fluid to the storage portion 7. For example, the input portion can comprise one or more connection ports that can facilitate fluidically connecting the storage portion 7 to another device (not shown), e.g., displacement device 5, sample vial, sample container and/or pump. Thus, a fluid can be provided to the storage portion 7 and can be stored or contained therein. This process (i.e. providing a fluid, e.g. a sample, to the storage portion 7) can also be referred to as sample loading.

The storage portion 7 may further comprise an output portion (not shown) configured to facilitate outputting a fluid from the storage portion 7. For example, the output portion can comprise one or more connection ports that can facilitate fluidically connecting the storage portion 7 to another downstream device (not shown), e.g., a chromatographic column. This can allow a fluid that can be comprised in the storage portion 7 to be provided to another downstream device. This process, (i.e. providing a fluid, e.g., a sample, from the storage portion 7 to a downstream device) can also be referred to as sample injection.

In some embodiments, the storage portion 7 can comprise a fluid conducting element, such as a capillary. Typically, the fluid conducting element can be provided relatively long, thus providing a sufficient volume that can be occupied by a fluid (e.g. the sample). The sample storage portion 7 can also be realized as a sample loop.

Thus, the device 10 can be configured for sample loading (i.e. receiving a sample) and sample injection (i.e. providing the sample to a downstream device). For example, in a chromatography system, the device 10 (which forms part of the chromatography system) can be used to draw a sample from a sample vial and inject the sample into the chromatographic column. Moreover, the device 10 can be fluidically connected with a high-pressure pump which can facilitate injecting the sample (with a solvent, i.e., mobile phase) to a chromatographic column with high pressure. The sample loading and sample injection can be a critical step in a chromatographic analysis. Issues related to the sample injection may have an immediate effect on the analytical performance. Thus, means to detect existing and developing issues of the sample injection mechanism can be highly beneficial with regard to ease of use and robustness. A key parameter that can allow for evaluation of the performance of the sample injector 10 can be the pressure in the sample storage portion 7, particularly during sample precompression (discussed below) and loading. Embodiments of the herein described invention relate to how such evaluation of the pressure in the sample storage portion of the injector can be applied to diagnose, detect and identify developing or existing issues.

The device 10 can further comprise a sensor device 56. The sensor device 56 can be configured for obtaining (i.e. measuring) a pressure characteristic indicative for a pressure in the sample storage portion 7. More particularly, the sensor device 56 can measure the pressure in the sample storage portion 7 and/or a feature indicative for the pressure in the sample storage portion 7. That is, the sensor device 56 can measure the pressure in the sample storage portion 7 directly and/or indirectly. For example, the sensor device 56 may comprise a pressure sensor 56 which can be configured to measure the pressure in the sample storage portion 7. Alternatively or additionally, the sensor device 56 may comprise a force sensor 56, configured to measure a force exerted on a surface. Based on the measured force, the pressure in the storage portion 7 may be determined. For example, the force sensor 56 may be provided in the displacement device 5. As discussed, the displacement device 5 can be fluidically connected to the storage portion 7 and can be configured for displacing a volume therein. As such, by measuring the force acting on a surface of the volume displacement device 5 (and knowing the area of the surface), the pressure in the storage portion 7 can be determined. Similarly, the electrical power consumption and/or current and/or voltage required by the displacement device 5 can be measured and based thereon the pressure in the storage portion 7 can be determined. Thus, the sensor device 56 may comprise a power sensor, current sensor and/or voltage sensor.

It will be understood that the above are only some exemplary means of obtaining the pressure in the sample storage portion 7. The person skilled in the art will appreciate that in general any means for measuring a pressure can be used.

Further, a data processing system 60 can be provided. The data processing system 60 can comprise one or more processing units configured to carry out computer instructions of a program (i.e. machine readable and executable instructions). The processing unit(s) can be singular or plural. For example, the processing system 60 may comprise at least one of CPU, GPU, DSP, APU, or FPGA. The data processing system 60 can comprise memory components, such as main memory (e.g. RAM), cache memory (e.g. SRAM) and/or secondary memory (e.g. HDD, SDD). The data processing system 60 may comprise volatile and/or non-volatile memory such an SDRAM, DRAM, SRAM, Flash Memory, MRAM, F-RAM, or P-RAM. The data processing system 60 can comprise internal communication interfaces (e.g. busses) configured to facilitate electronic data exchange between components of the data processing system 60, such as the communication between the memory components and the processing components. The data processing system 60 can comprise external communication interfaces configured to facilitate electronic data exchange with devices external to the data processing system 60. The data processing system 60 can be configured for wired and/or wireless data communication. For example, the data processing system 60 can be configured to transfer electronic data using a standardized communication protocol. The data processing system 60 can comprise a system-on-chip comprising processing units, memory components and busses.

The data processing system 60 may be a centralized or distributed computing system. In some embodiments, the data processing system 60 may be external to the device 10. Alternatively, the data processing system 60 and the device 10 may be integrated into a single device. For example, the device 10 may comprise the data processing system 60.

The data processing system 60 can facilitate automating the operations of the device 10. That is, the data processing system 60 may control the device 10 such that the processing of sample loading and sample injection and any other process in between can be automatically performed. In addition, the data processing system 60 may automatically monitor the operation of the device 10, as will be discussed with respect to the following figures.

The data processing system 60 can be operatively connected to other components. More particularly, data processing system 60 may be operatively connected to the distribution valve 3 (and more particularly to the rotatable drives thereof, see FIGS. 1b to 9), to the sample pick up means 43 (e.g. sample needle 43, see FIGS. 1b to 9, and more particularly to a drive of the sample needle, not shown), to the analytical pump 40 (also referred to as high-pressure pump 40, see FIGS. 1b to 9) and to the volume displacement device 5 (more particularly, to the stepper motor of the sampling device 5).

The data processing system 60 can include a data processing unit and may be configured to control the system and carry out particular method steps (e.g. FIGS. 10 to 15b). The controller can send or receive electronic signals for instructions. The controller can also be referred to as a microprocessor. The controller can be contained on an integrated-circuit chip. The controller can include a processor with memory and associated circuits. A microprocessor is a computer processor that incorporates the functions of a central processing unit on a single integrated circuit (IC), or sometimes up to a plurality of integrated circuits, such as 8 integrated circuits. The microprocessor may be a multipurpose, clock driven, register based, digital integrated circuit that accepts binary data as input, processes it according to instructions stored in its memory and provides results (also in binary form) as output. Microprocessors may contain both combinational logic and sequential digital logic. Microprocessors operate on numbers and symbols represented in the binary number system.

Furthermore, it should be understood that the sample injector 10 and the system (see FIGS. 1b to 9) may be configured to measure pressures at different locations of sample injector (10) and the system. For example, the system may comprise a plurality of pressure sensors. For example, a first pressure sensor may be located in the analytical pump 40, and a second pressure sensor (e.g. sensor device 56) may be located in the volume displacement device 5. These pressure sensors may also be operatively connected to the data processing system 60, and the data processing system 60 may use readings of these pressure sensors when controlling the operation of the system and/or sample injector 10. The pressure sensors may be configured to measure the pressure directly. However, it should be understood that also other parameters may be measured and may be used to determine the respective pressures (and that such a procedure should also be understood as a pressure measurement and the components involved should be understood as pressure sensors). For example, it will be understood that when an analytical pump 40 supplies a solvent at a flow rate, the power consumption of the analytical pump 40 will also depend on the pressure at which it operates—the higher the operating pressure, the higher the power consumption. Thus, e.g., the power consumption of the pump 40 may also be used to derive the pressure present at the pump 40. A corresponding consideration also applies for the volume displacement device 5: The higher the pressure present in the volume displacement device 5, the higher the power consumption when the piston 53 is moved further into the housing 50 (see FIGS. 1b to 9). Thus, the system 100 may generally be configured to measure pressures present at different locations of the system and the sample injector 10.

With respect to FIGS. 1b to 9, a preferred embodiment of the device 10 configured as a sample injector 10 in a chromatography system 10 will be discussed.

Figure 1B:
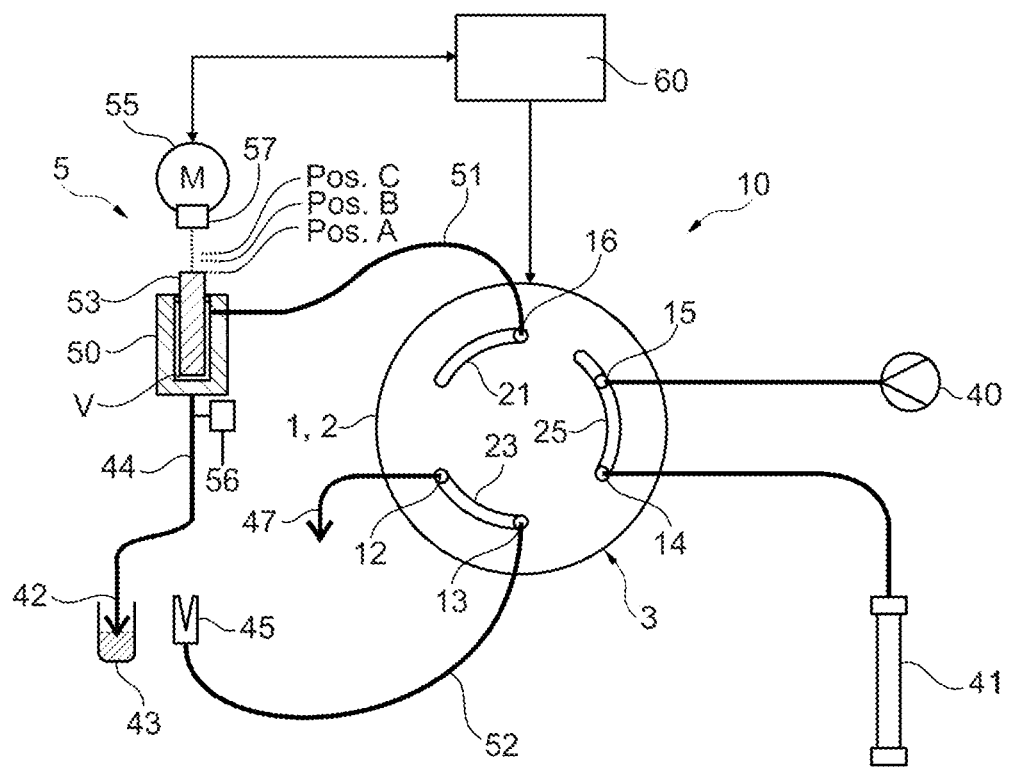
FIG. 1b shows a schematic representation of an HPLC system with a sample injector according to the invention, which system further comprises a chromatography column, wherein an injection valve is situated in the LOAD position and the process of taking in a sample volume can begin in the state shown.

FIG. 1b shows a schematic representation of an HPLC system with a sample injector 10 that operates in accordance with the Split Loop Principle and can comprise a volume displacement device 5, an injection valve 3 and a high-pressure pump 40. The sample injector 10 furthermore can comprise a sample storage portion 7 (that can also be referred to as storage portion) that may include a first connecting piece 51 and a second connecting piece 52, 44. These may be comprised of a pressure-resistant line with a small diameter, for example in the form of a capillary tube of glass or stainless steel. The connecting piece 51 can be connected to a first storage portion port 16 of the injection valve 3 and to the volume displacement device 5 or its pump volume V, respectively. The second connecting piece 52, 44 is comprised of an intake segment 44 and a feed segment 52 and can be realized in a separable fashion. For this purpose, the feed segment 52 may lead into an injection port 45 that can be connected to a second storage portion port 13 of the injection valve 3 via the feed segment 52. The intake segment 44 that can be connected to the pump volume V of the volume displacement device 5 with one end may feature on its other end a sample needle 42, by means of which the intake segment 44 can be connected to the injection port 45.

However, the sample needle 42 can also be moved to a sample container 43 and take in a defined sample volume into the intake segment 44 as described in greater detail below. Furthermore, the sample needle 41 can also be moved to a (not-shown) container for a flushing fluid in order to withdraw flushing fluid for a flushing process and to clean the storage portion 7 (i.e. the connecting pieces 51, 52, 44), the pump volume V and, if applicable, also the ports and the grooves or channels of the injection valve 3. Due to the special topology of the Split Loop Principle shown, flushing of the storage portion 7 and of the volume displacement device 5 is normally not required because they are flushed during an injection process anyway, namely with eluent supplied by the pump 40. However, the outside of the sample needle 42 can also be cleaned by immersing the needle into a container with cleaning or flushing fluid.

In the embodiment shown, the volume displacement device 5 may comprise a syringe 50, in which a plunger 53 can be guided in a displaceable and pressure-tight fashion. The plunger 53 can be referred to as a movable element 53 or piston 53. The syringe 50 can also be referred to as a housing 50. The plunger 53 can be driven by means of a drive 55 that can be realized, for example, in the form of a stepper motor. The drive 55 can be controlled by the data processing system 60. The data processing system 60 can also control the change-over processes of the injection valve 3 that features a not-shown controllable drive.

A waste port 12 of the injection valve 3 can be connected to a waste line 47, from which fluid can be discharged into a not-shown waste reservoir.

The high-pressure pump 40 can be connected to a high-pressure port 15 of the injection valve 3. A chromatography column 41 can be connected to the other high-pressure port 14 of the injection valve 3. The high-pressure pump 40 may be integrated into and form part of the sample injector 10 or be arranged in another unit or a separate pump unit.

The injection valve 3 may include a stator 1 and a rotor 2. The stator 1 may feature the two high-pressure ports 14, 15, the two storage portion ports 13, 16 and the waste port 12. The injection valve 3 can be connected to the other functional elements of the HPLC system via these ports and the above-described connecting lines that may be realized in the form of capillary connections. The high-pressure screw connections required for this purpose are not illustrated in FIG. 1B in order to provide a better overview. For reasons of simplicity, the injection valve is illustrated in the interface between the stator 1 and the rotor 2, wherein the design of the face of the stator 1 and the design of the face of the rotor 2 are shown in order to better comprehend the function of the injection valve. Within the injection valve 3, the ports can be realized in the form of bores that lead to the other side of the stator 1. The rotor 2 may feature a number of arc-shaped grooves 21, 23, 25 that are exactly aligned with the bores of the input and output ports.

That is, the injection valve 3, which can also be referred to as a distribution valve, may comprise a stator and a rotor, and a rotatable drive. The stator may comprise the plurality of ports, and the rotor may comprise connecting elements (e.g. grooves) to connect the ports to one another. The rotor can be rotated with respect to the stator (by means of the rotatable drive) so that the connecting elements may establish connections between different ports. The rotatable drive can include a motor, gearbox and encoder.

The rotor 2 can be pressed against the stator with a certain pressing force such that a common interface between the rotor 1 and the stator 2 can be formed, at which both components are mutually sealed. In this case, the pressing force can be chosen sufficiently high, such that the arrangement can also remain sealed at the highest pressures to be expected.

In the first LOAD position of the injection valve 3 illustrated in FIG. 1b, the grooves 21, 23, 25 are aligned relative to the ports 12-16 in such a way that the grooves 25 and 23 respectively connect the two high-pressure ports 14, 15 and the waste port 12 to the storage portion port 13. In this LOAD position, the high-pressure pump 40 can therefore convey fluid towards the chromatography column 41. Furthermore, the storage portion port 16 can be closed in a pressure-tight fashion.

Figure 2:
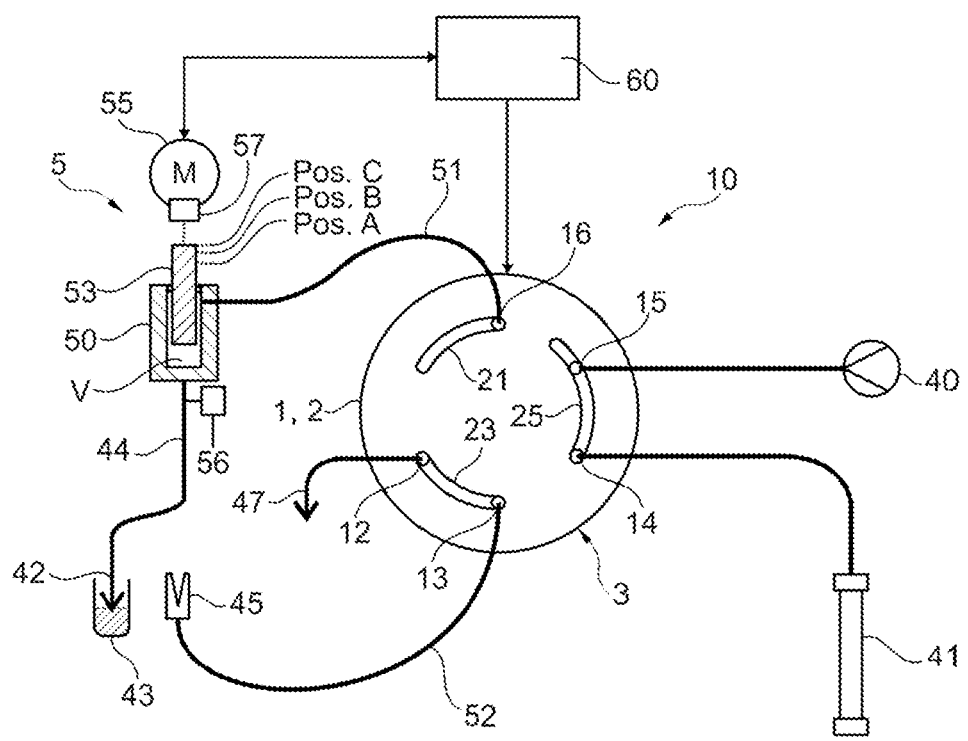
FIG. 2 shows the HPLC system of FIG. 1b, wherein the plunger of the syringe was moved into the end position (position C) in order to take in the sample volume.

In the state illustrated in FIG. 1B, the sample needle 42 is moved into the sample container 43 such that a sample volume can be taken in. For this purpose, the plunger 53 is situated in the position A and can be moved into the position C by the data processing system 60 in order to take in the sample volume. The desired defined sample volume is then drawn into the intake segment 44, wherein the volume of the sample can be smaller than the volume of the intake segment 44. FIG. 2 shows the state of the HPLC system after the intake process is completed.

Figure 3:
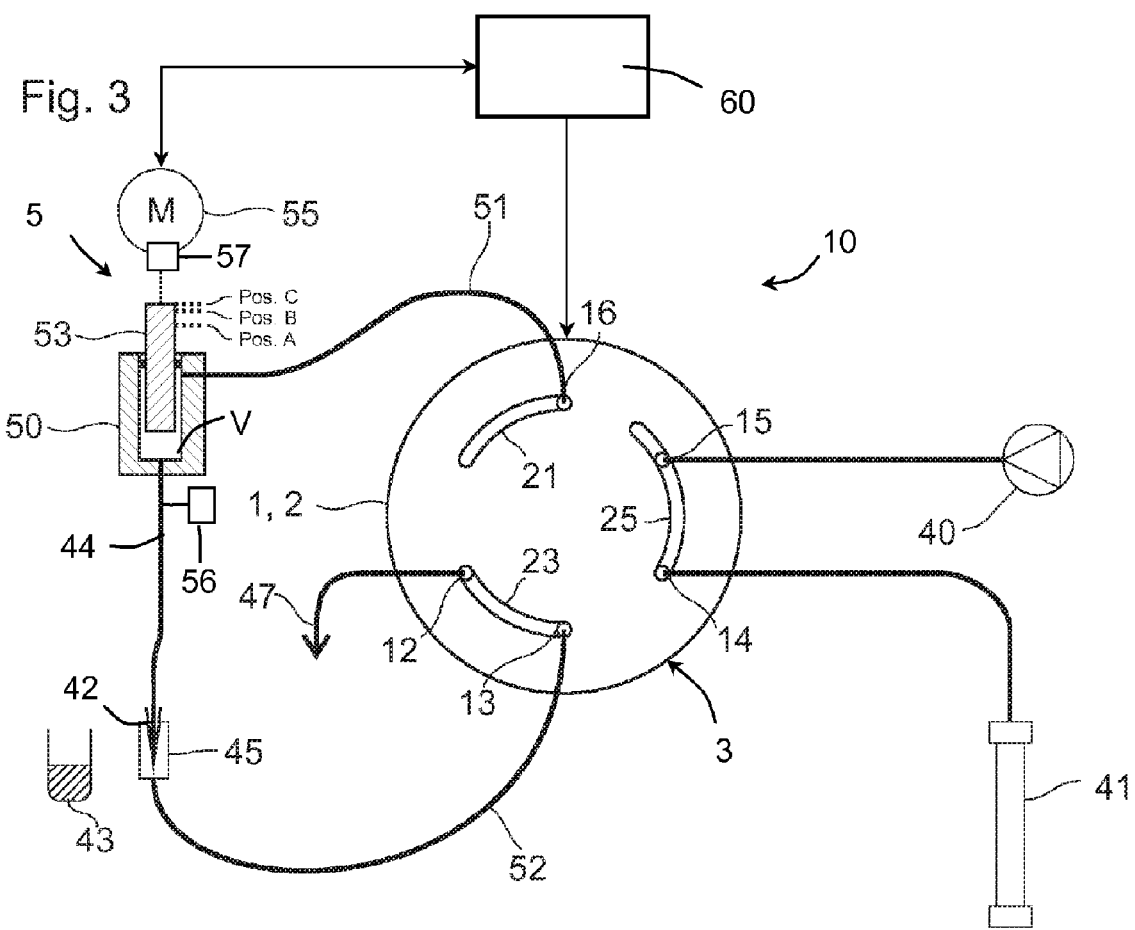
FIG. 3 shows the HPLC system of FIG. 2, wherein the sample needle was moved into the injection port.

In order to inject the sample volume situated in the intake segment 44, the sample needle 42 is moved into the injection port 45. This port seals the needle point in a high-pressure-resistant fashion. This state is illustrated in FIG. 3.

Figure 4:
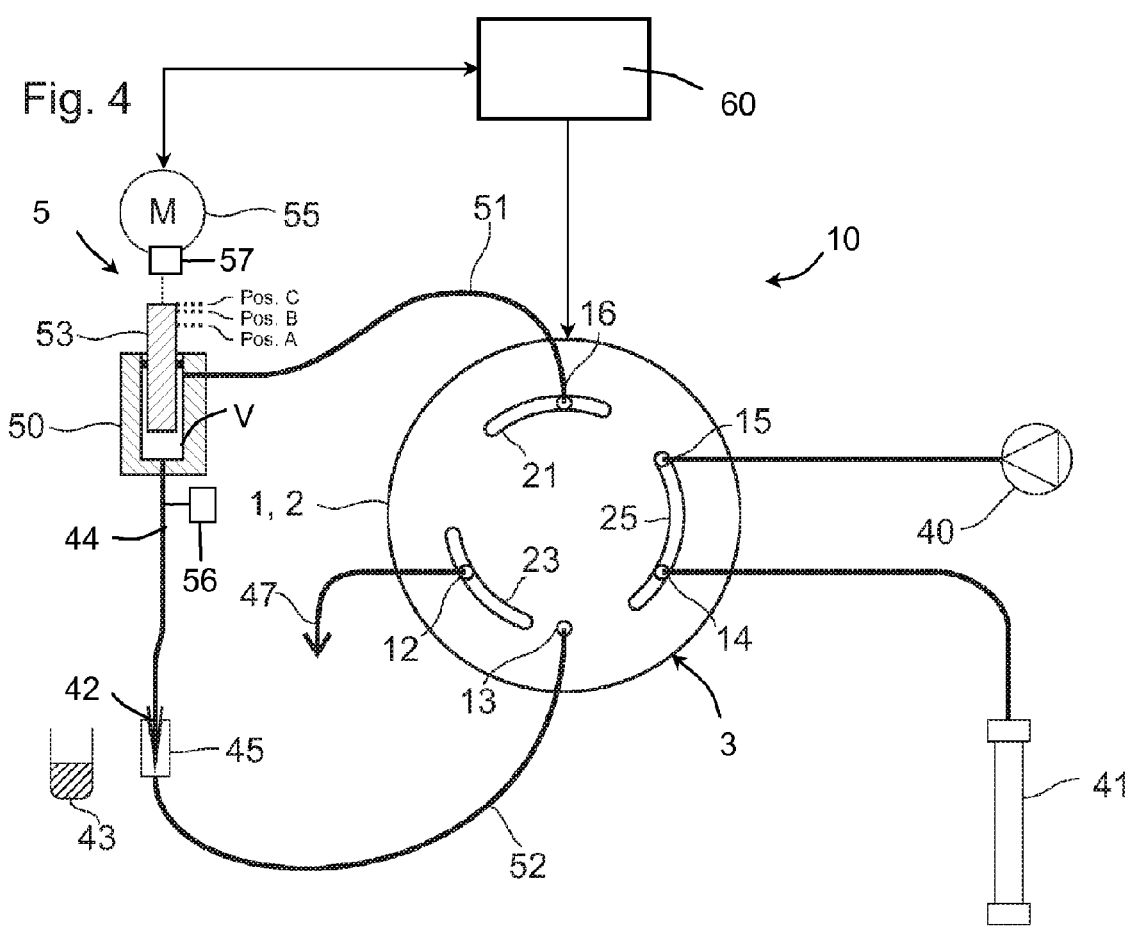
FIG. 4 shows the HPLC system of FIG. 3, wherein the injection valve was changed over from the LOAD position into the PRESSURE COMPENSATION position.

In the next step, the pressure in the storage portion can be adjusted to the operating pressure of the chromatography column 41, i.e., to the pressure, with which the high-pressure pump 40 supplies fluid to the inlet of the chromatography column 41. For this purpose, the injection valve is initially changed over into a PRESSURE COMPENSATION position (or configuration), in which the connecting piece 51 and the second connecting piece or the feed segment 52 of the storage portion 7 are not connected to the other components connected to the injection valve 3 (FIG. 4).

In this PRESSURE COMPENSATION position, the plunger 53 of the high-pressure-resistant volume displacement device 5 is moved into the position B (FIG. 5). In order to prevent an interruption of the flow through the chromatography column 41 while conveying the volume required for the compression of the storage portion content, the groove 25 in the rotor 2 of the valve can be realized in a correspondingly elongated fashion such that the two high-pressure ports 14, 15 are still connected in the PRESSURE COMPENSATION position. The travel of the plunger 53 from position C into position B leads to a pressure required for building up the pressure can be calculated from the compressibility of the fluid volume enclosed in the volume displacement device 5 and in the storage portion 7, the elasticity of the arrangement and the current pump pressure (if all these parameters are known). Alternatively, a pressure compensation can be achieved with the aid of a control circuit for the pressure in the high-pressure-resistant volume displacement device 5.

For this purpose, the pressure needs to be measured at a suitable location and the position of the plunger 53 in the volume displacement device 5 needs to be adjusted by the drive 55 in such a way that the pressure corresponds to the required target pressure (=column pressure). Pressure measurement may be realized with a pressure sensor such as sensor 56 or indirectly by means of a force measurement or power consumption measurement. Conceivable solutions are force measurements on the plunger 53 or in the drive 55 and/or power consumption, current and/or voltage measurements in the drive 55. After pressure equality is achieved, the valve can be changed over into the INJECT position in order to inject the sample volume into the column 41 (FIG. 6).

In the embodiment shown, the data processing system 60 measures the force that the drive 55 needs to exert in order to achieve a corresponding compression in the storage portion. For this purpose, the drive 55 may feature an integrated sensor 57, the signal of which is fed to the data processing system 60 (as indicated with a double arrow between the drive 55 and the data processing system 60). Due to this measurement, the data processing system can determine the actual pressure in the pump volume and therefore in the storage portion (the pressure drop in the connecting pieces and in the valve is negligibly small) and adjust this pressure to the desired value.

Figure 7:
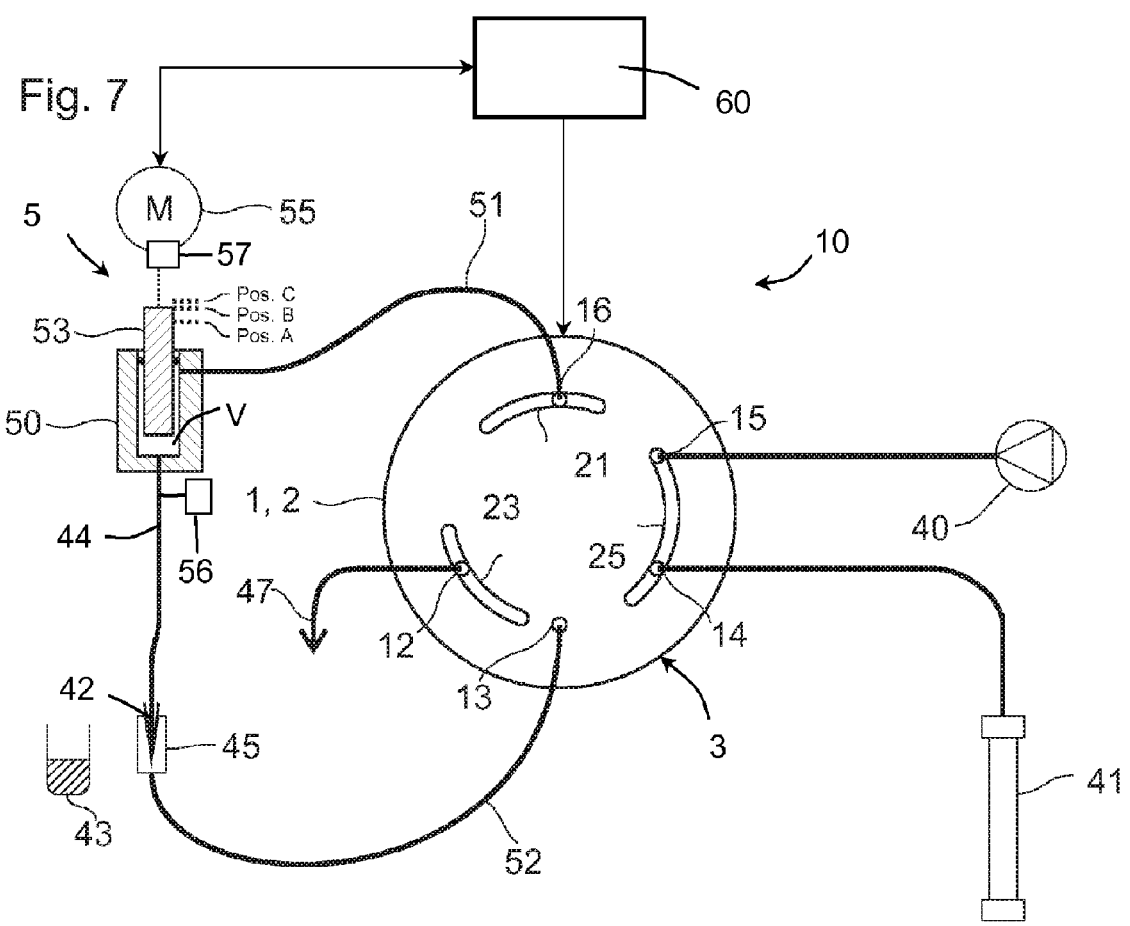
FIG. 7 shows the HPLC system of FIG. 6, wherein the injection valve was changed over from the INJECT position into the PRESSURE COMPENSATION position after the injection of the sample volume.

After the entire sample volume has been conveyed from the intake segment 44 to the column 41 by means of the fluid conveyed by the pump 40, the valve can be once again changed over into the PRESSURE COMPENSATION position in order to decompress the storage portion (FIG. 7).

Figure 8:
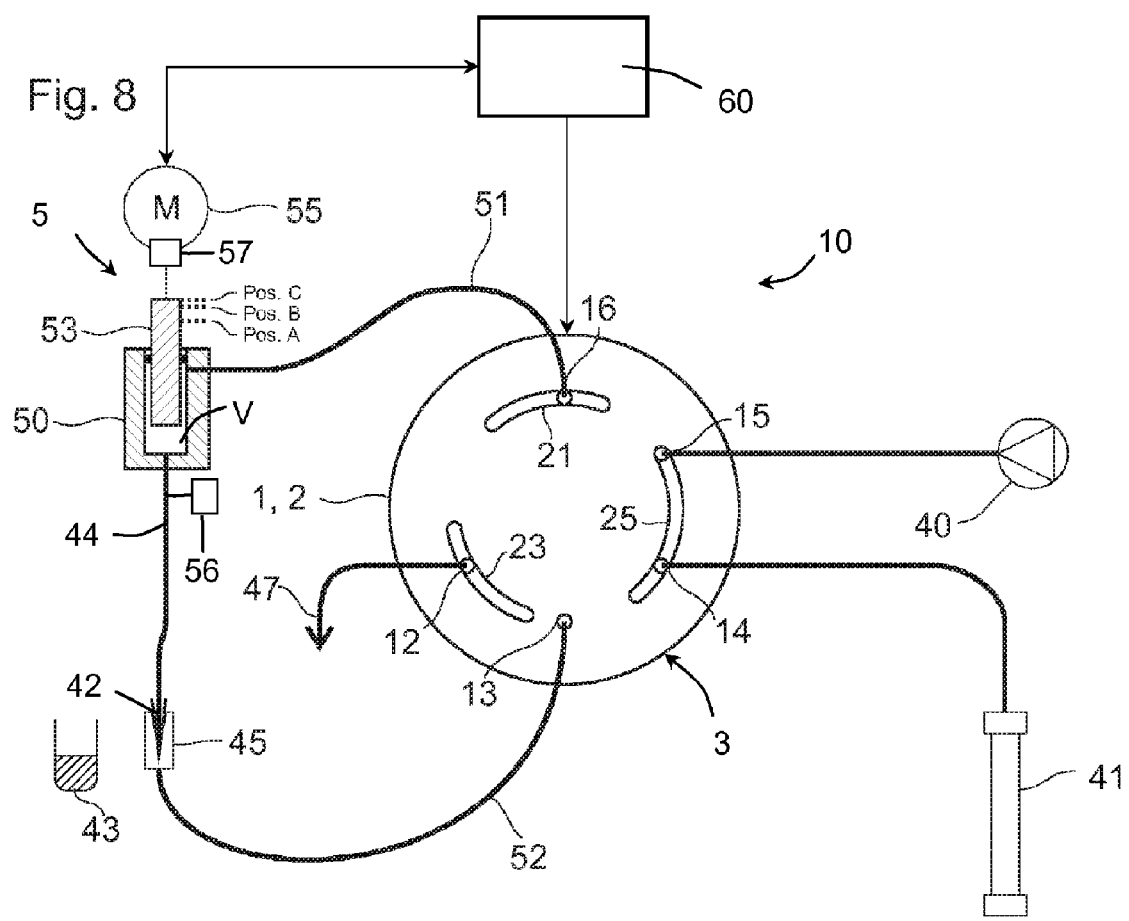
FIG. 8 shows the HPLC system of FIG. 7, wherein the plunger was moved into the end position (position C) in order to realize a pressure compensation (pressure reduction)

The plunger 53 can be moved from the position illustrated in FIG. 7 into position C. This causes the pressure in the storage portion to be adjusted to the atmospheric pressure. This state of the HPLC system is illustrated in FIG. 8. During this decompression time in the PRESSURE COMPENSATION position of the injection valve 3, the column 41 can be connected to the pump 40 via the elongated groove 25 in order to prevent pressure drops. The travel of the plunger 53 from position B to position C can either be calculated analogous to the compression in FIG. 5 or determined by measuring and controlling the pressure. Alternatively, the pressure can also be determined indirectly by means of a force measurement on the plunger 53 or on the drive 55 of the plunger.

Figure 9:
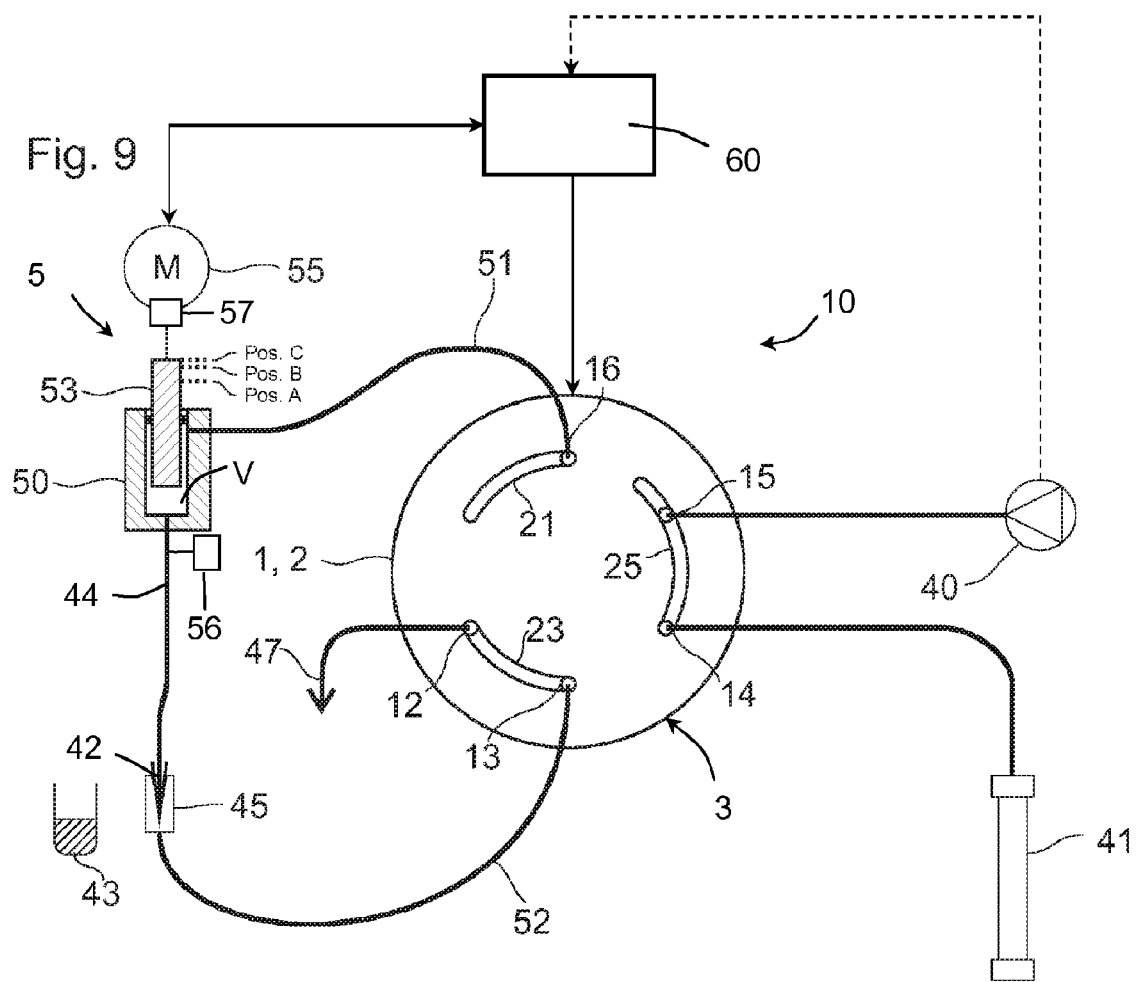
FIG. 9 shows the HPLC system of FIG. 8, wherein the injection valve was changed over from the PRESSURE COMPENSATION position into the LOAD position.

After the storage portion has been decompressed, the valve 3 is changed over into the LOAD position (FIG. 9). No damaging flows in the injection valve occur during this process.

The plunger 53 of the high-pressure-resistant volume displacement device 5 can now be moved back into the starting position A. The excess quantity of fluid is discharged via the waste connection 47. The unpressurized needle 42 can subsequently be moved from the needle seat of the injection port 45 to the corresponding sample bottle in order to take in the next sample.

The position C during the decompression may also differ from the starting position A prior to the compression. For example, if gradients (time-controlled mixing ratio of the eluent) are pumped through the column, the position C at the end of the decompression may differ because the compressibility of the loop content may have changed.

The data processing system 60 can store predetermined positions A, B, C and/or differences in the distance between these positions as a function of parameters of the entire sample injector, particularly the compressibility of the eluent, elasticity properties of the storage portion and the volume displacement device, etc. The plunger can then be automatically moved into these positions (i.e., without a control) or these positions may serve as approximate values or initial values for a controlled movement.

In order to determine the positions A, B, C and the respective travel of the plunger, a change-over of the injection valve 3 may be carried out without compression or decompression, respectively. The pressure drop can then be determined by means of a pressure sensor and the required travel as well as the respective positions B or C can be determined based on this pressure drop. The thus determined values can then be stored and used for other change-over processes, in which a compression or decompression takes place. A corresponding sensor may also be provided in the pump 40. However, pumps of this type for HPLC typically feature a pressure sensor for controlling the conveyed eluent anyway. The compressibility of the medium, particularly of the eluent, can also be determined by means of the pump 40. Such pumps are realized, for example, in the form of dual-plunger pumps, in which the change-over from one plunger to the other plunger is suitably controlled or regulated by means of a pressure sensor and a data processing system in such a way that a highly constant flow rate is achieved. Since the compressibility of the medium also needs to be taken into account during this change-over process, the compressibility can be determined by suitably controlling the dual-plunger pump during the change-over from one plunger to the other plunger and fed to the data processing system 60 as information. This connection between the pump 40 and the data processing system 60 is merely illustrated with broken lines in FIG. 9.

In the automatic sample injector shown, the pressure in the storage portion is adjusted to the current operating pressure of the chromatography column by means of decompression in the sufficiently (high) pressure-resistant volume displacement device when the injection valve is in a special intermediate position, namely the PRESSURE COMPENSATION position, before the intake segment is moved into the flow path toward the chromatography column, i.e., before the injection valve is changed over into the INJECT position.

In addition, the pressure in the storage portion is adjusted to the atmospheric pressure (decompression) in the same intermediate position of the injection valve, namely the PRESSURE COMPENSATION position, by taking in an exactly defined additional fluid quantity into the volume displacement device before the storage portion is separated in order to take in a sample volume from a sample container, i.e., before the injection valve is changed over into the LOAD position.

The compression and decompression volumes do not flow through the injection valve. Consequently, the service life of the (high-pressure) injection valve of the sample injector is only limited by the unavoidable abrasion between the rotor and the stator and, if applicable, the abrasive effect, for example, of dirt particles or sample material.

Figure 10:
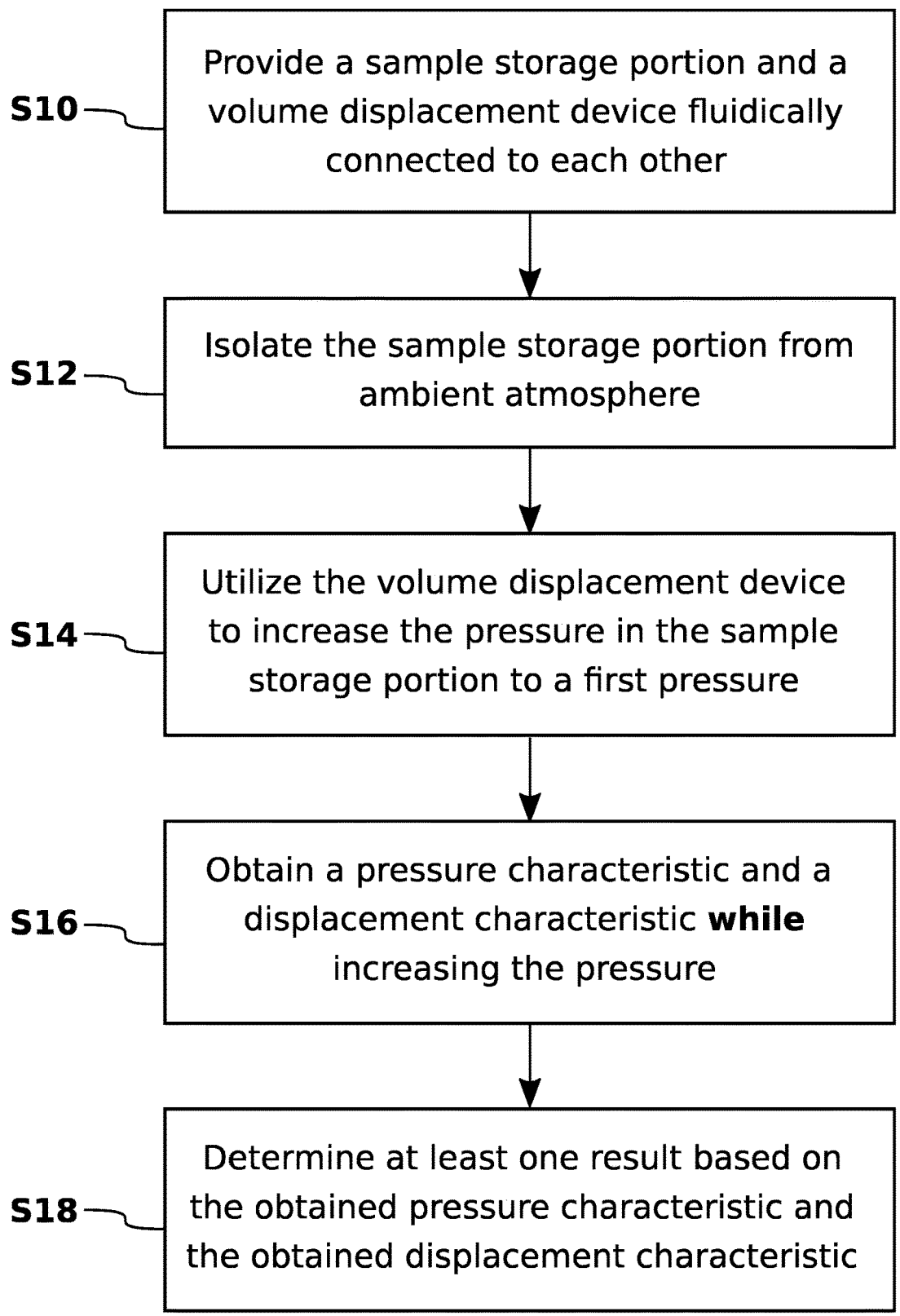
FIG. 10 illustrates a method for monitoring a sample injector based on characteristics obtained while increasing a pressure in the sample storage portion.

FIG. 10 illustrates a first method for monitoring a device 10 (see FIG. 1*a*), such as the sample injector 10 (see FIGS. 1*b* to 9).

Thus, in a first step S10 the method comprises providing a sample storage portion and a volume displacement device fluidically connected to each other (e.g. see FIG. 1*a*). In some embodiments, in step S10 the method can comprise providing a sample storage portion and a volume displacement device and fluidically connecting the sample storage portion and the volume displacement device. Thus, the volume displacement device and the sample storage portion can define or enclose a joint volume. This is, for example, illustrated in FIG. 3.

In a step S12, the method can comprise isolating the sample storage portion from ambient atmosphere. Thus, ideally, no fluid may flow in or out the volume defined (i.e. enclosed) by the displacement device and the storage portion. This is, for example, illustrated in FIG. 4, wherein ports or openings that may allow a fluid to flow in and/or out of the volume defined (i.e. enclosed) by the displacement device and the storage portion are isolated.

In a step S14, the method can comprise utilizing the volume displacement device to increase the pressure in the sample storage portion to a first pressure. This step can also be referred to as a pressure compensation or precompression (see FIG. 5).

In a step S16, the method can comprise obtaining a pressure characteristic and a volume displacement characteristic while increasing the pressure. That is, step S16 can be performed during step S14. The pressure characteristic can be indicative for a pressure of the sample storage portion. As discussed, the sensor device 56 (see FIG. 1*a*) can be configured to obtain the pressure characteristic. Thus, during step S16 the sensor device 56 can be utilized to obtain the pressure characteristic. On the other hand, the displacement characteristic can be indicative for a displacement volume of the volume displacement device, when the volume displacement device. For example, the displacement characteristic may comprise data indicating the pump volume V of the volume displacement device 5 and/or the position of the plunger 53 of the volume displacement device 5 (see, e.g., FIG. 1*b*).

As discussed, the data processing system 60 can control the displacement device. As such, the data processing system 60 can obtain the displacement characteristic while controlling the volume displacement device. For example, the data processing system 60 may record the position of the plunger 53 while controlling it. Alternatively or additionally, the displacement device can be configured to output and provide the displacement characteristic (the position of the plunger 53) to the data processing system 60. Moreover, the data processing system 60 may control the sensor device 56. During step S16, the data processing system 60 may trigger the sensor device 56 to perform a measurement for obtaining the pressure characteristic. Moreover, the sensor device 56 can be configured to output the data obtained during the measurement (i.e. the pressure characteristic) and provide the data obtained during the measurement (i.e. the pressure characteristic) to the data processing system 60. Preferably, the data processing system 60 obtains the pressure characteristic and the displacement characteristic in a synchronous fashion. For example, the data processing system 60 can obtain the position of the plunger 53 and trigger the sensor device 56 simultaneously. This can be repeated a plurality of times. Thus, for each value of the displacement volume a respective pressure value can be obtained.

In a step S18, the method can comprise determining at least one result based on the obtained pressure characteristic and the obtained displacement characteristic. The at least one result may comprise determining a compressibility of a fluid contained in the sample storage portion (see FIG. 11). Moreover, determining the at least one result can comprise utilizing the determined compressibility to classify the fluid in the storage portion as one or a combination of air, water, organic chromatography solvent and non-organic chromatography solvent. That is, a composition of the fluid(s) in the storage portion can be determined based on the determined compressibility. Additionally or alternatively, determining the at least one result can comprise utilizing the determined compressibility to determine a number of different fluid types contained in the sample storage portion.

Such a result can be used, e.g., for comparison reasons. For example, if the presently described technology determines a compressibility significantly different from the compressibility of the fluid that is currently used, this typically indicates an error. For example, the fluid that is expected to be currently used may in fact not be used, i.e., a different fluid may erroneously be used. As a further example, there may be a leak in the system or a blockage of the system, thus leading to a different compressibility measure.

Figure 11:
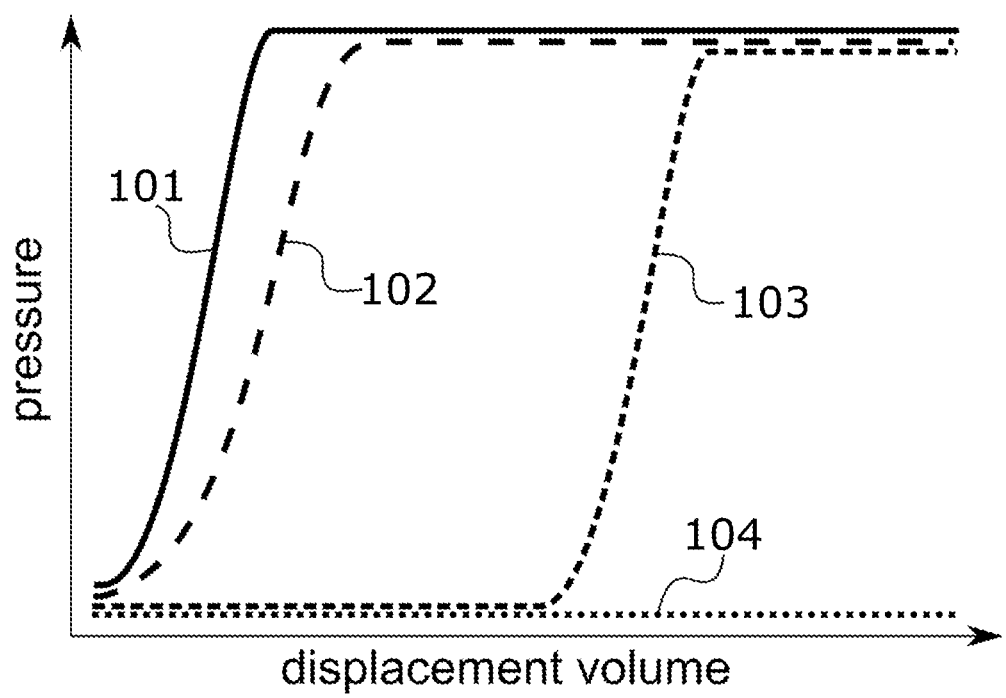
FIG. 11 illustrates characteristics that can be obtained while increasing a pressure in the sample storage portion.

FIG. 11 illustrates the dependency between the pressure in the sample storage portion and the displacement volume of the volume displacement device, for different fluids that can be contained in the storage portion. Pressure vs displacement volume curves, illustrated in FIG. 11, can be calculated during step S18 (see FIG. 10) based on the pressure characteristic and displacement characteristic that can be obtained in step S16.

As discussed, for precompression of the sample (i.e. step S14) the plunger 53 of the displacement device 5 can move forward thereby compressing the fluid in the sample storage portion. While increasing the pressure in the storage portion, the plunger position as well as the pressure of the fluid in the sample storage portion can be recorded (i.e. obtained) and evaluated by dedicated electronics (e.g. sensor device 56 and data processing system 60). This can allow to relate the pressure increase to the volume displaced by the volume displacement device 5. Thus, with increasing volume displacement, an increasing pressure can be obtained. The increase in pressure is dependent on the (isothermal) compressibility $\beta_T$ of the fluid(s) in the sample loop. Where $\beta_T$ is defined as $$\beta_T = -\frac{1}{V}\left(\frac{\delta V}{\delta p}\right)_T$$

where V is the volume, p the pressure and T the temperature. The latter parameter can be assumed to be constant, i.e. isothermal conditions can be assumed. Generally, this is a fair assumption for conditions under which chromatographic systems are operated. That is, assuming a constant temperature may introduce very small and negligible errors. In other words, the assumption of isothermal conditions, particularly in chromatography systems wherein the conditions generally hold, can have a small and negligible negative effect on the usability of the determined compressibility $\beta_T$.

Different fluids have different compressibilities. Particularly, gaseous media show a significantly higher compressibility compared to liquids. Thus measuring the compressibility of the fluid(s) in the sample storage portion can allow to draw conclusions on the media that is contained in this volume. For this purpose the pressure during precompression of the fluid in the sample storage portion can be recorded and compared to the displacement volume (i.e. step S16). FIG. 11 shows schematically such data that can be obtained for different scenarios, i.e., for different compositions and phases of the fluids contained in the sample storage portion.

Curve 101 indicates the pressure relative to the displacement volume during the precompression of a fluid with rather low compressibility. As depicted by curve 101, the pressure shows a strong increase with respect to the displaced volume. That is, even a small decrease of the volume containing the fluid (corresponding to a small increase of the displacement volume) leads to a significant increase of the pressure.

Curve 102 indicates the pressure relative to the displacement volume during precompression of a fluid with a different and higher compressibility. Curve 102 indicates a different and slower increase of the pressure for increasing volume displacement compared to Case I. For example, water shows a lower compressibility compared to organic solvents such as acetonitrile or methanol. A typical scenario where a different than desired or expected fluid would be used for sample injection, would be accidental mixing of chromatography solvents. In sample injectors, frequently more than one solvent can be used for washing purposes. Typically two different kinds of solvents can be used; nonorganic and organic solvents of which one can be used for sample injection and the other for removal of sample residues from the injector (typically referred to as "washing").

Thus, if by accident a different fluid with a different compressibility would be used for sample injection, this could be detected (i.e. determined in step S18) by the discrepancy in pressure increase (and thus in compressibility).

Curve 103 indicates the pressure relative to the displacement volume for precompression of two different fluids with largely different compressibility. As depicted, the pressure signal is initially very low. During this phase, the fluid with the very high compressibility is compressed. This essentially flat pressure plateau is followed by a strong increase in pressure (comparable to curve 101). During this phase essentially the fluid with the low compressibility is compressed. A typical scenario for such a case is when an air plug (very high compressibility) surrounded by a liquid such as water (very low compressibility) is present in the sample storage portion during precompression (i.e. step S14). This would be the case if the sample injector would have aspired air rather than a liquid sample either due to a missing sample vial or a lack of a sample vial (e.g., a broken sample vial).

Curve 104 indicates the pressure relative to the displacement volume for precompression of a fluid with very high compressibility. Compared to curves 101 to 103, as indicated by curve 104 the pressure shows a very low (negligible) increase over the entire compression period. This is due to the presence of a fluid with very high compressibility in the sample storage portion. In liquid chromatography such a case would be a scenario where the reservoir(s) or sample container from which the injector system refills would be empty. Thus, instead of the desired liquid the injector syringe would be filled with ambient air.

Thus, embodiments of the present invention relate to monitoring a sample injector 10 while the pressure in the sample storage portion is increased (i.e. during pressure compensation or precompression). More particularly, a pressure characteristic and a displacement characteristic can be obtained. Based thereon, the compressibility of the fluid(s) that can be contained in the sample storage portion 7 of the sample injector 10 can be calculated. This can allow to draw further conclusions on the fluid contained in the sample storage portion 7 of the sample injector 10.

For example, the determined compressibility can be compared to an expected compressibility (i.e. to the compressibility of a fluid expected to be contained in the storage portion). Based on the comparison, it can be determined whether the expected fluid is contained in the storage portion. Furthermore, by evaluating the dependency of the pressure on the displacement volume, the type, phase and number of fluid(s) contained in the storage portion can be determined. Further still, based on the determined compressibility, it can be determined whether the sample storage portion contains a liquid sample or is empty (i.e. filled with ambient air). In some embodiments, a database of fluid unique IDs and their respective compressibility can be provided. This can allow to determine the type of fluid that can be contained in the storage portion.

In the above, the compressibility of the fluid(s) in the storage portion was determined and utilized to draw further conclusions on the fluid(s). However, it will be understood that similarly the dependency between the pressure and the displacement volume of a fluid during precompression can be used to draw conclusion of the fluid. Thus, the extra step of calculating the compressibility can be avoided.

Furthermore, it will be understood that the pressure characteristic and the displacement characteristic are electronic data (although visually depicted in FIG. 11 as curves). This can be advantageous, as the step of determining at least one result based on the obtained pressure characteristic and the obtained displacement characteristic can be performed automatically by the data processing system 60.

With respect to the preceding FIGS. 10 and 11, a first method of monitoring a sample injector 10 is discussed. Generally, the method comprises monitoring the sample injector 10 while increasing a pressure in the sample storage portion. Based thereon, at least one result can be determined. In a further aspect, the present invention relates to a second method of monitoring a sample injector 10. As will be discussed in the following, the method generally comprises monitoring the sample injector 10 after increasing a pressure in the storage portion and based thereon determining at least one result. That is, while the first method monitors the sample injector while increasing the pressure in the sample storage portion, the second method monitors the sample injector after increasing the pressure in the storage portion.

Figure 12A:
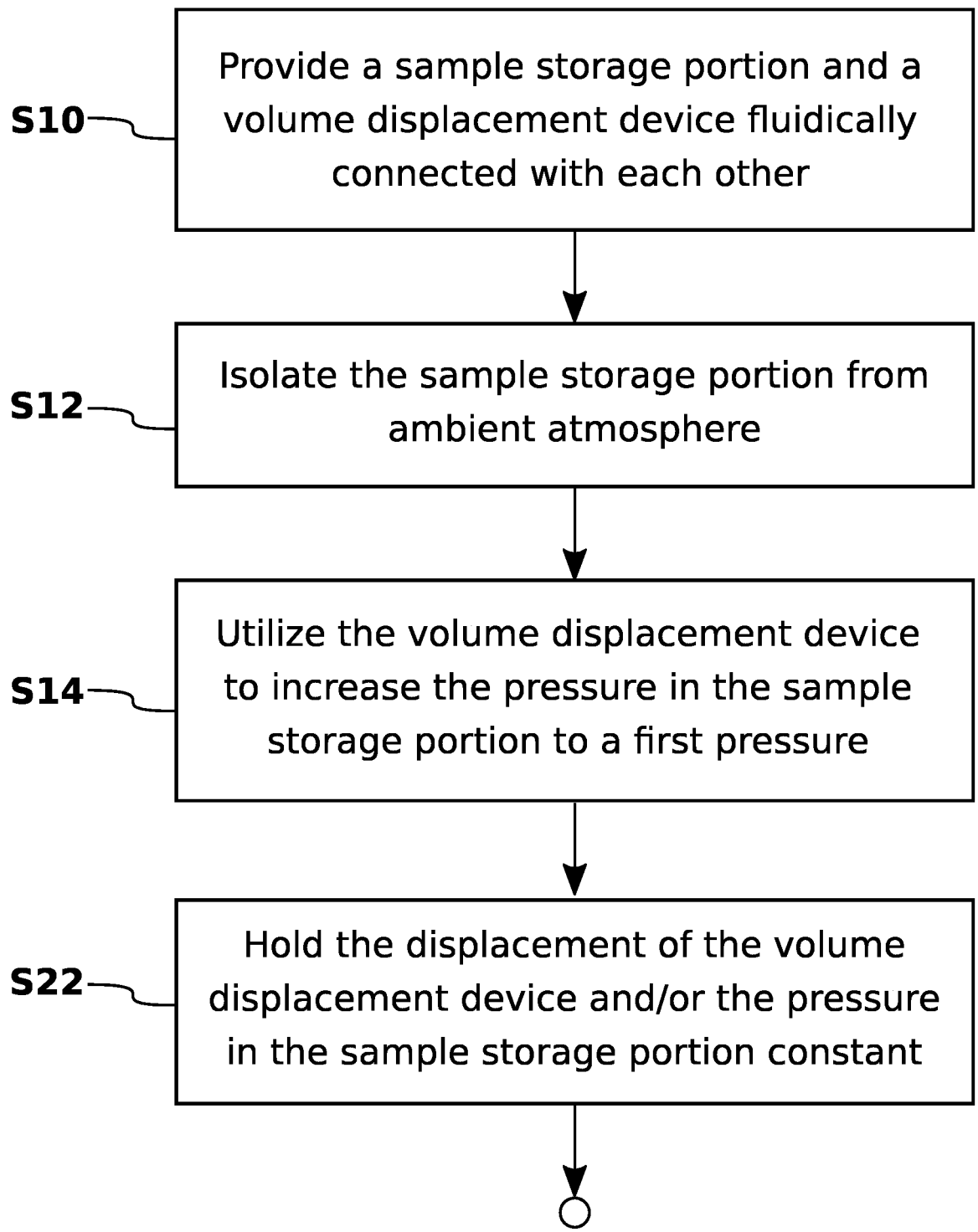
FIGS. 12a and 12b illustrate a method for monitoring a sample injector based on characteristics obtained after increasing a pressure in the sample storage portion.
Figure 12B:
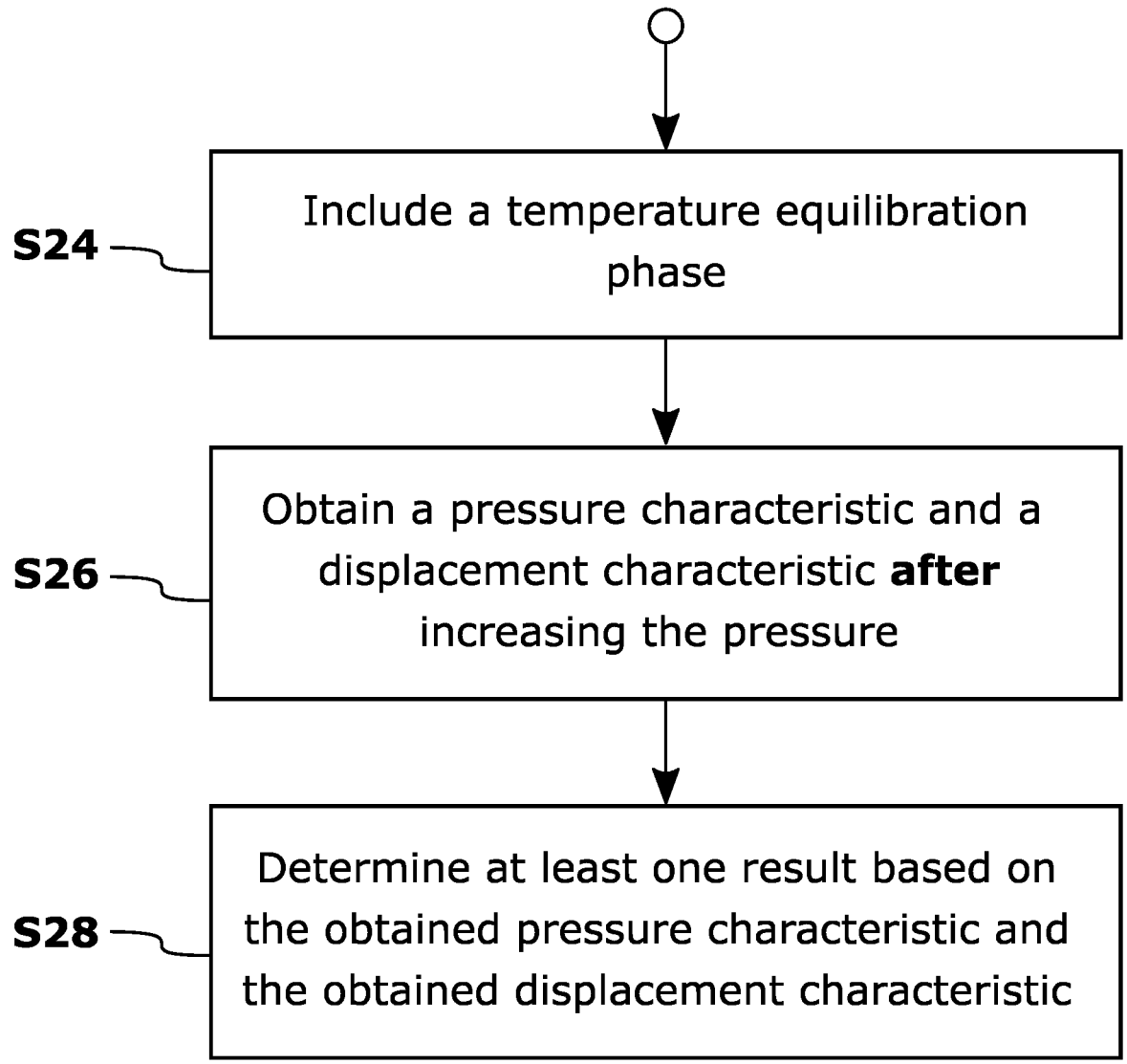

FIGS. 12a and 12b illustrate the second method for monitoring the device 10 (see FIG. 1a) such as the sample injector 10 (see FIGS. 1b to 9).

The second method comprises steps S10, S12 and S14, as discussed, with respect to the first method.

Further, in a step S22 the method can comprise holding the displacement of the volume displacement device and/or the pressure in the sample storage portion constant. As discussed, in step S14 the pressure in the storage portion can be increased to a first pressure by utilizing the displacement device.

In some embodiments, the pressure in the storage portion may not be regulated. That is, the device 10 may not be configured for pressure regulation. As such, after increasing the pressure in the storage portion (in step S14), no further adjustment of the pressure may be performed in some embodiments. In such embodiments, the amount of volume displaced by the displacement device remains constant after step S14. Thus, under normal or desirable conditions, the pressure in the storage portion also remains constant after it is increased in step S14. However, due to different phenomena, e.g., leakages or temperature change, the pressure in the storage portion can change.

Alternatively, in some embodiments, the pressure in the storage portion may be regulated. That is, the device 10 may be configured for pressure regulation. As such, after increasing the pressure in the storage portion (in step S14), further adjustments of the pressure can be performed. That is, the displacement device can be further utilized to normalize the pressure (after step S14), such that it can remain substantially constant. For this, the displacement device can adjust the displacement volume, hence causing displacement volume to increase or decrease and to thus maintain a constant pressure in the sample storage portion. For example, the adjustment of the pressure in the storage portion can be based on a feedback loop principle. More particularly, it can be facilitated by measuring the pressure in the storage portion (e.g. with the sensor device 56) and controlling the displacement device based on the measured pressure to compensate for pressure drops or increases (if any). Again, under normal or desirable conditions, after step S14, the pressure in the storage portion remains constant and as such no further adjustment by the displacement device are required. However, due to different phenomena, e.g., leakages or temperature change, the pressure in the storage portion can be subject to change and as such the displacement volume can correspondingly be changed to hold the pressure in the storage portion constant.

Thus, in step S22, in a device 10 configured for pressure regulation, the pressure in the storage portion can remain substantially constant. Alternatively, in other embodiments (e.g., in a device 10 not configured for pressure regulation), the displacement volume of the displacement device can remain substantially constant. Under desirable conditions (i.e. no leakages and no temperature change) both the pressure and the displacement volume can remain constant after step S14.

In some embodiments, the method may comprise step S24, wherein the method can comprise a temperature equilibration phase after increasing the pressure in the sample storage portion to the first pressure and before obtaining the pressure characteristic and the displacement characteristic (see step S26). That is, after increasing the pressure in the storage portion in step S14, the fluid in the storage portion may be let to rest for a period of time. This can allow the fluid in the storage portion to reach an equilibrium state such that more accurate measurement can be obtained. More particularly, during step S14, the fluid in the storage portion, as expected, is pressurized. However, during pressurization the fluid can also gain heat. Thus, the fluid in the storage portion can be at a higher temperature. This can cause the pressure in the storage portion to be higher. However, this is an excited state of the fluid in the storage portion caused by the pressurization step S14. By allowing a temperature equilibration phase, the fluid in the storage portion can go into an equilibrium state. Thus, the measurement can better reflect the state of the fluid in the storage portion. The temperature equilibration phase in step S14 can be performed for a duration of at least 10 s and at most 120 s.

In a step S26 the method can comprise obtaining a pressure characteristic and a volume displacement characteristic after increasing the pressure in the storage portion. That is, step S26 can be performed after step S14 (not to be confused with step S16, FIG. 10, which can be performed during step S14). Again, the pressure sensor 56 can be utilized to obtain the pressure characteristic and the displacement characteristic can be obtained based on the control of the displacement device.

As discussed, in some embodiments, the volume displacement can be maintained constant after step S14. In such embodiments, in step S26, only the pressure in the storage portion can be measured for obtaining the pressure characteristic, as the displacement characteristic is already known (from step S14). Alternatively, in some embodiments the pressure in the storage portion can be maintained constant, based on pressure regulation. In such embodiments, there may be no need to measure the pressure in the storage portion for obtaining the pressure characteristic, as it can be already known from step S14. In such embodiments, during step S26 only the volume displacement of the volume displacement device can be measured.

However, in some embodiments, both the pressure in the storage portion and the volume displacement of the volume displacement device can be measured during step S26.

In a step S28, the method can comprise determining at least one result based on the pressure characteristic and the displacement characteristic obtained after increasing the pressure. Step S28 should not be confused with step S18. During the latter, the at least one result is determined based on the pressure characteristic and the displacement characteristic obtained while increasing the pressure.

Generally, under isothermal conditions, the pressure and volume displacement are expected to remain constant, while the measurements are performed. However, in case of a leakage, the pressure (in case of no pressure regulation) can drop or the volume displacement (in case of pressure regulation) can increase (corresponding to an increase of the displacement volume). In other words, under isothermal conditions, a leakage can cause either the pressure or the volume displacement to change. Thus, by evaluating the pressure characteristic and the displacement characteristic in step S28, for example, leakage can be determined.

Step S28 can for example utilize a truth table (or a similar representation), such as the one illustrated in FIG. 13. The truth table shown in FIG. 13 summarizes the results that can be determined by analyzing the pressure characteristic and the displacement characteristic. The results are shown for the case when no pressure regulation is (first 3 rows excluding the table head) and for the case when pressure regulation is used (rows 4 to 6).

The second column indicates the sign of the rate of change of the displacement volume (i.e. $\Delta D/\Delta t$). The displacement volume may remain constant (in this case comprising a 0 rate of change), may increase (in this case comprising a positive rate of change) or may decrease (in this case comprising a negative rate of change). A change in the displacement volume causes the opposite change in the volume enclosed by the displacement device and the storage portion. In this regard, it will be understood that this volume V is variable. In the embodiment depicted in FIGS. 1b to 9, it depends on the position of the plunger 53. That is, an increase in the displacement volume causes a decrease of the said volume and a decrease in the displacement volume causes an increase of the volume. In other words, $$\frac{\Delta D}{\Delta t} = -\frac{\Delta V}{\Delta t}$$

where D is the displacement volume of the displacement device, V is the volume enclosed by the displacement device and the storage portion and t is the time.

As it can be noticed from the table, when no pressure regulation is used, the rate of change of the displacement volume is 0 (i.e. the displacement volume remains constant). That is, in such embodiments, the displacement volume is kept constant and the pressure changes.

The third column indicates the sign of the rate of change of the pressure in the storage portion $$\left(\text{i.e. } \frac{\Delta P}{\Delta t}\right).$$

Similarly, the pressure may remain constant (in this case comprising a 0 rate of change), may increase (in this case comprising a positive rate of change) or may decrease (in this case comprising a negative rate of change). As it can be noticed from the table, when pressure regulation is used, the rate of change of the pressure is 0 (i.e. the pressure remains constant). That is, in such embodiments, the pressure is regulated to remain at a constant value.

When both the displacement volume and the pressure are constant (i.e. lines 1 and 4), it can be determined that no leakage is present.

When the displacement volume is constant and the pressure increases (i.e. line 2), it can be determined that either a leakage is present and/or there is a temperature rise. In case of isothermal conditions, it can be determined that there is a leakage. Moreover, as the pressure increases it can be determined that the leakage is an input leakage. That is, further fluid is being introduced into the storage portion. While such an input leakage may generally by a relatively unlikely scenario, it may, for example, occur in case the system is erroneously set to the inject position (see FIG. 6) and the pressure provided by the pump 40 is higher than the pre-compression pressure. In such a case, the pressure in the sample storage portion will rise. This will generally be the case when the sample storage portion is (by error) fluidically connected to a section at a pressure exceeding the desired pressure in the sample storage portion.

When the displacement volume is constant and the pressure decreases (i.e. line 3), it can be determined that either a leakage is present and/or there is a temperature drop. In case of isothermal conditions, it can be determined that there is a leakage. Moreover, as the pressure decreases it can be determined that the leakage is an output leakage. That is, fluid is exiting the storage portion.

When the displacement volume increases and the pressure is constant (i.e. line 5), it can be determined that either a leakage is present and/or there is a temperature drop. In case of isothermal conditions, it can be determined that there is a leakage. Moreover, as the displacement volume increases it can be determined that the leakage is an output leakage. This can be based on the rationale that the displacement volume is increasing to compensate for pressure drop (due to fluid exiting the storage portion).

When the displacement volume decreases and the pressure is constant (i.e. line 6), it can be determined that either a leakage is present and/or there is a temperature rise. In case of isothermal conditions, it can be determined that there is a leakage. Moreover, as the displacement volume decreases it can be determined that the leakage is an input leakage. This can be based on the rationale that the displacement volume is decreasing to compensate for pressure increase (due to further fluid entering the storage portion).

Moreover, the method can comprise determining a volumetric leakage rate.

In some embodiments, the volumetric leakage rate can be determined based on the pressure characteristic and displacement volume obtained in step S16 (see FIG. 10) and the ones obtained in step S26. More particularly, the volumetric leakage rate can be determined using the compressibility of the fluid that can be determined based on the pressure characteristic and displacement volume obtained in step S16 (see FIG. 10) and pressure change that can be determined based on the pressure characteristic and displacement volume obtained in step S26. This can be particularly the case when no pressure regulation is used.

Alternatively, if the compressibility of the fluid in the storage portion can be known, the volumetric leakage rate can be determined using the known compressibility and the result that can be determined based on the pressure characteristic and displacement volume obtained in step S26.

Alternatively, if pressure regulation is used, the volumetric leakage rate can be determined based on the displacement characteristic. More particularly, the volumetric leak rate can be determined as the average or net volume displacement for maintaining the pressure constant over a duration of time.

Figure 14A:
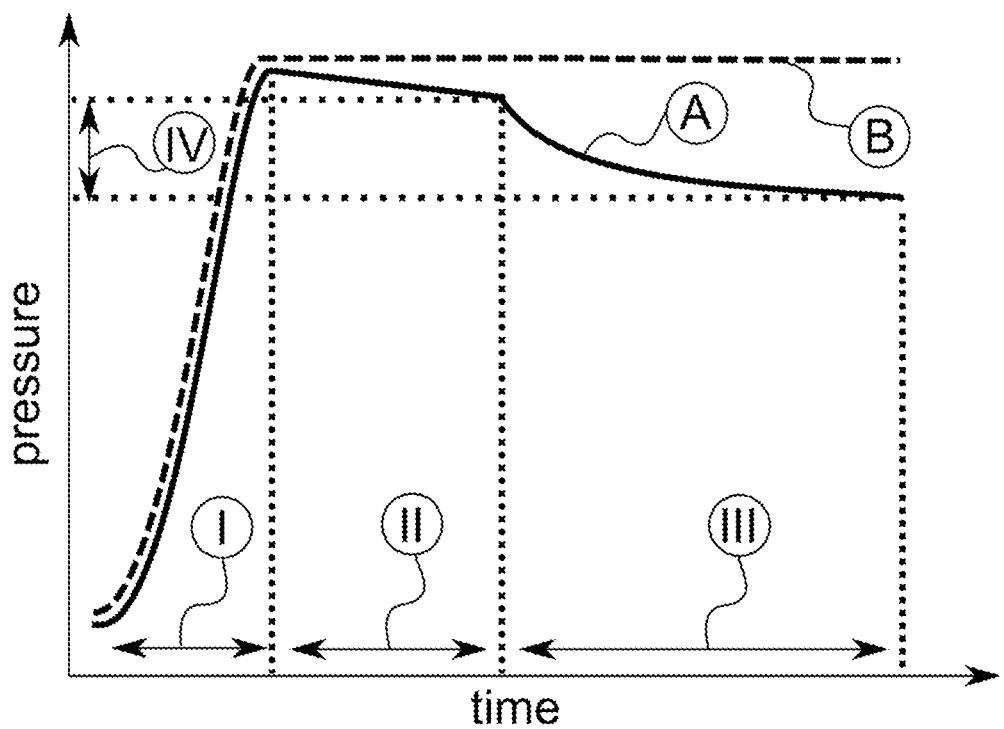
FIG. 14a illustrates pressure characteristics that can be obtained after increasing a pressure in the sample storage portion.
Figure 14B:
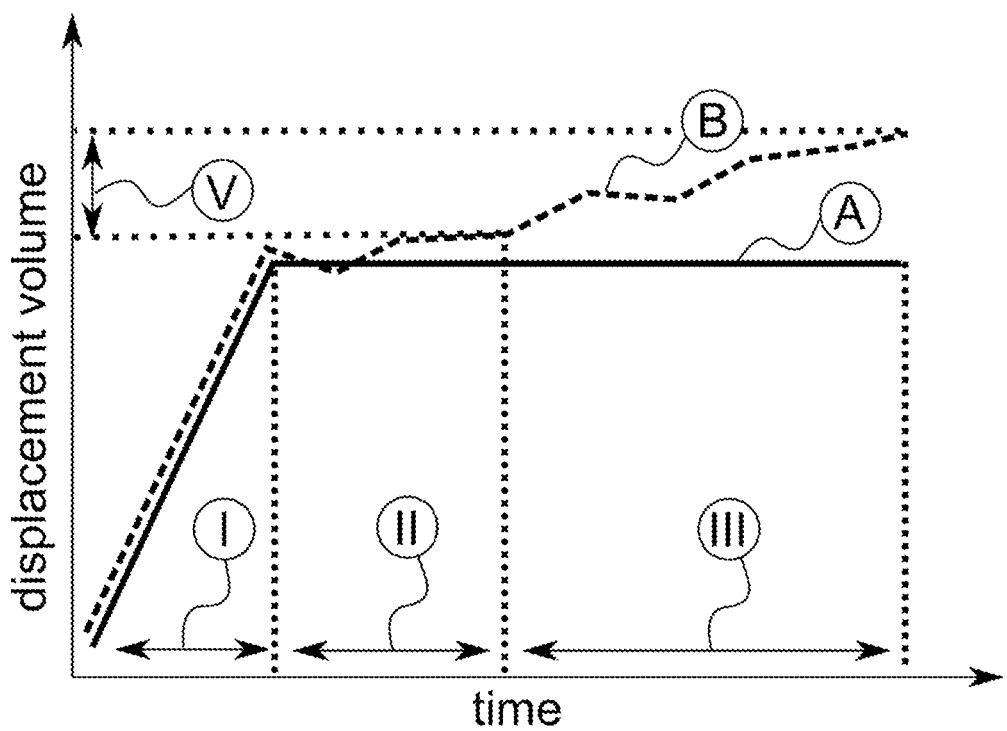
FIG. 14b illustrates displacement characteristics that can be obtained after increasing a pressure in the sample storage portion.

FIGS. 14a and 14b illustrate an example of a pressure characteristic (curve A, FIG. 14a) and displacement characteristic (curve A, FIG. 14b) when no pressure compensation is used and an example of a pressure characteristic (curve B, FIG. 14a) and displacement characteristic (curve B, FIG. 14b) when pressure compensation is used. That is, the curves with a continuous line and labeled by letter A illustrate the pressure in the storage portion and the displacement volume of the displacement device when no pressure regulation is used, i.e., when the pressure can change and the displacement volume is held constant. On the other hand, the curves with a dashed line and labeled by letter B illustrate the pressure in the storage portion and the displacement volume of the displacement device when pressure regulation is used, i.e., a situation where the pressure is controlled by changing the displacement volume. Moreover, FIG. 14a illustrates the pressure characteristic relative to time and FIG. 14b illustrates the displacement characteristic relative to time.

Moreover, the time is divided into multiple slots, labeled as I, II and III. Each of these slots, indicate different phases of the device 10.

As discussed, the leak tightness of the sample injector 10 can be evaluated. For this purpose, the pressure of the fluid in the sample storage portion relative to the displacement volume (e.g. the plunger 53 position) during precompression can be evaluated. Under isothermal conditions, the pressure of a perfectly leak-tight system (i.e. $\Delta V_{liquid}=0$) is constant (i.e. $\Delta P=0$).

First, the fluid in the sample loop is compressed (FIGS. 14a, 14b—I). That is, step S14 is performed as indicated by the increase in pressure and displacement volume during time slot I.

This can be followed by an equilibration phase (FIGS. 14a, 14b—II). This can be to assure (approximate) isothermal conditions of the system after pressurization, as discussed with reference to step S24, FIG. 12b. Thus, the temperature of the fluid which may heat during compression can equilibrate, as well as the pressure and/or the displacement volume. It is noted that under typical operating conditions temperature effects can be neglected for the aforementioned method (FIG. 10). The duration of time slot II can be at least 10 s and at most 120 s.

Afterwards (FIG. 14a, 14b—III) the leak tightness of the system can be evaluated by either of the following:

Monitoring the pressure while keeping the compressed volume constant (e.g. no movement of the plunger 53 of the syringe pump, see FIG. 1b). This is indicated by the solid lines and letter A in FIGS. 14a, 14b. In this case the loss of fluid due to leakage would result in a declining pressure over time (see FIG. 14a, curve A). The change in pressure $\Delta P$ over time can be proportional to the leak rate (see FIG. 14a, IV). If the compressibility of the fluid is available (e.g. determined in step S18), the pressure drop IV can be used to determine a volumetric leak rate.

Monitoring the piston movement while regulating the pressure to a constant value (see FIGS. 14a, 14b, curves B). In this case, loss of fluid due to leakage would cause the pressure to drop. To compensate for this, the displacement volume is increased to keep the pressure constant (i.e. to regulate the pressure). Moreover, the volumetric leak rate of the system can be determined as the average or net volume displacement for maintaining the pressure over the duration of the monitoring (see FIG. 14b—V).

Thus, the pressure signal during pressurization of the sample injector 10 can be used for diagnostic purposes of the sample injection workflow in a chromatography device. Hereby pressurization of the injector can refer to stages when the fluid contained in the sample injector can be pressurized to pressures exceeding ambient pressure. Pressurization can be due to actuation of the volume displacement device or by other actuation devices which are not integral part of the sample injector. In state of the art sample injectors for chromatography systems, no such pressure evaluation is used, if any pressure measurement is done at all. Analysis of the pressure during precompression relative to the piston position can allow to derive conclusion on the fluid(s) in the sample storage portion as well as determining potential leakages of the system which contains the fluid being compressed.

Embodiments of the herein presented invention can result in the following advantages:
  Robustness, as the detection of existing or developing issues, e.g., missing or incorrect injector fluids as wells as leakages can greatly reduce unplanned system downtime;
  Ease of use, as user errors such as missing sample, mixed or missing injector fluids can be automatically detected by the system;
  Reduced risk of losing limited and/or expensive samples as, a check of the presence of the correct solvent prior to aspiration of the sample can prevent sample loss.

As discussed, the device 10 (i.e. the sample injector 10) can be configured for injecting a sample to downstream device. For example, in a chromatography system the injector device 10 can be used for injecting a sample to a chromatographic column, as discussed with respect to FIGS. 1b to 9. In some aspects of the present invention, the sample injector 10 can be monitored during the injection of the fluid contained in the sample storage portion to a downstream device (e.g. chromatographic column). That is, the first method (see FIG. 10) and the second method (see FIGS. 12a, 12b) can be performed during a precompression phase, that can typically precede the injection phase. A third method can be performed during the injection phase as will be discussed in the following.

Figure 15A:
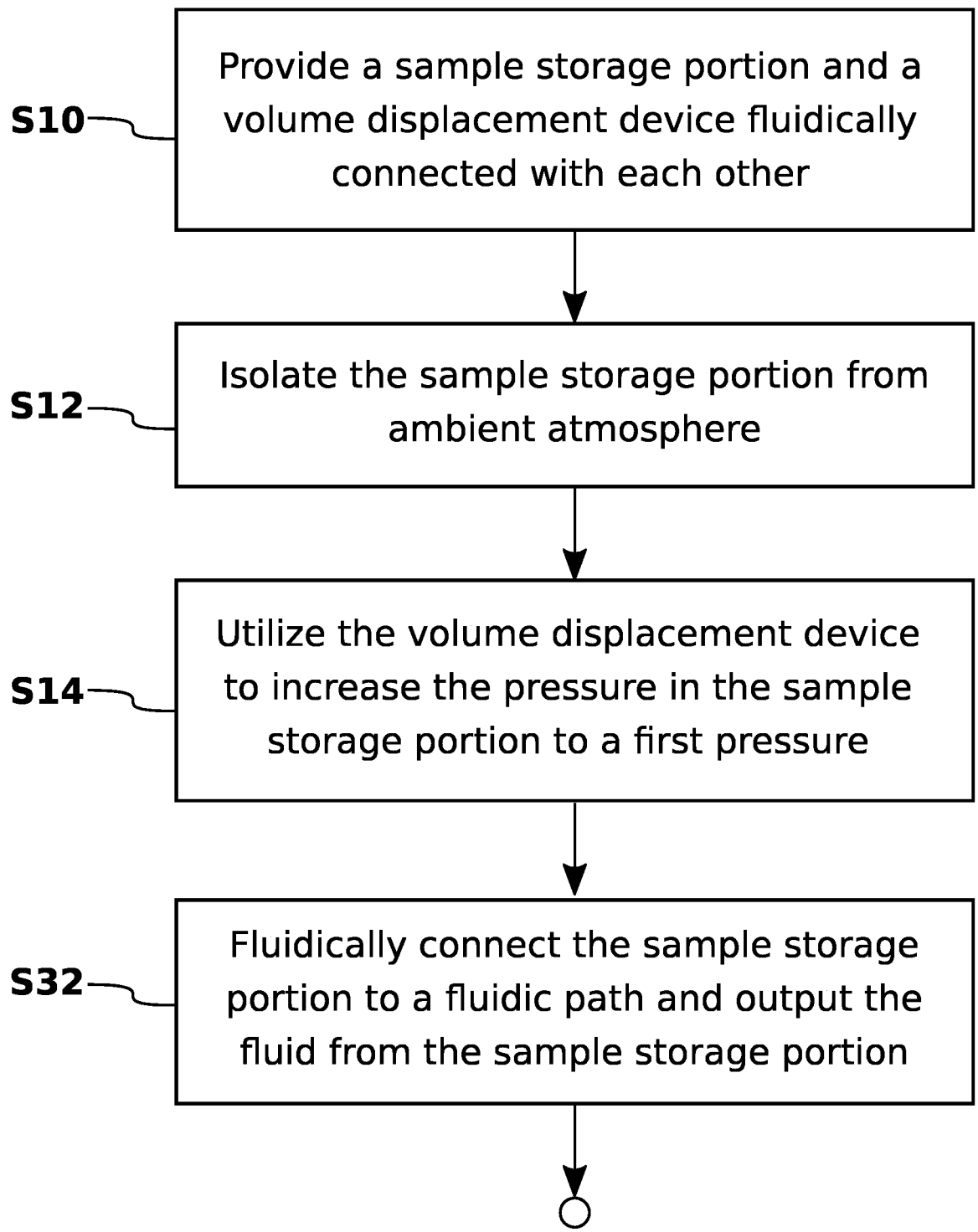
FIGS. 15a and 15b illustrate a method for monitoring a sample injector based on characteristics obtained after fluidically connecting the sample injector to a fluidic path.
Figure 15B:
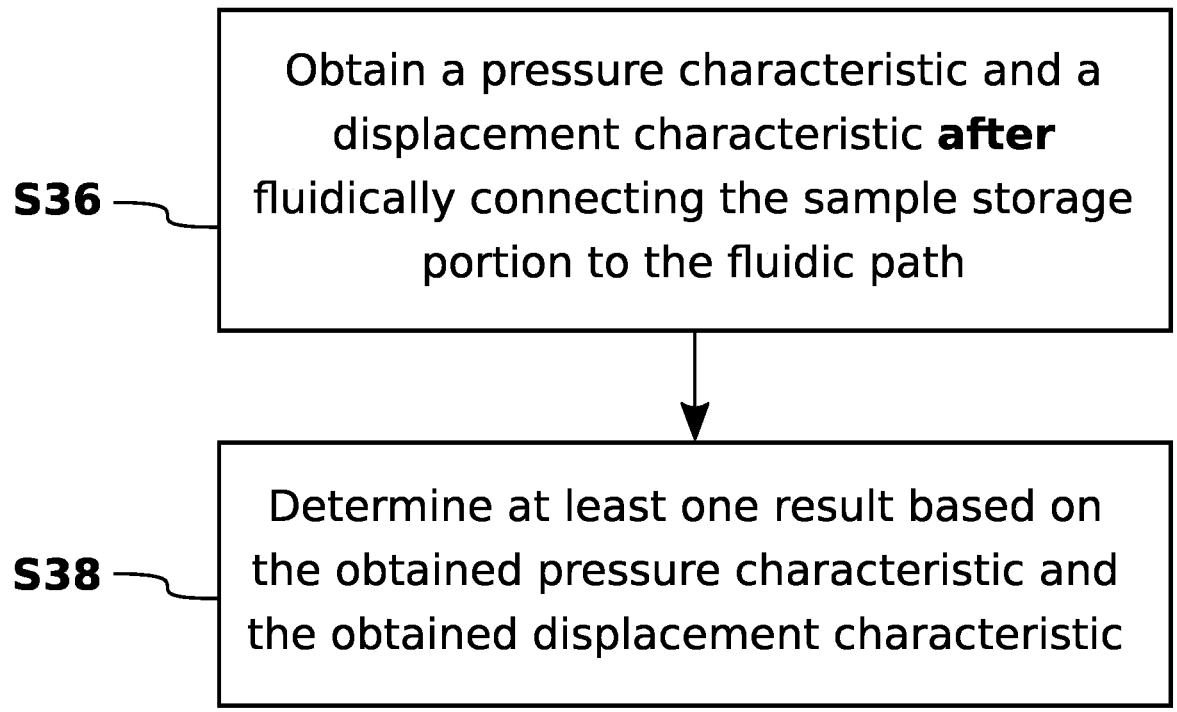

FIGS. 15a and 15b illustrate a third method for monitoring the device 10 (see FIG. 1a) such as the sample injector 10 (see FIGS. 1b to 9) while it injects a sample to a downstream device.

The third method can comprise steps S10, S12 and S14, as discussed with respect to the first and the second method.

After the pressure increase (i.e. after step S14) the method can comprise in a step S32 fluidically connecting the sample injector 10, more particularly the sample storage portion of the sample injector 10, to a fluidic path. The fluidic path can comprise a downstream device, such as, a chromatographic column. An example for such a configuration is depicted in FIG. 6b. In this Figure, the valve assumes a configuration, wherein the sample storage portion is fluidically connected to the chromatography column 41. Further, the port 16 of the valve 3 is not fluidically connected to another port, i.e., it constitutes a dead end. In this configuration, the volume displacement device 5 can be used to inject a sample in the sample storage portion into the chromatography column 41. It will be understood that this configuration (and in fact, the depicted system) is merely exemplary, and that in fact, other configurations and other systems may also be used which may assume a configuration allowing the volume displacement device 5 to push the sample into the chromatography column 41.

Generally, in such embodiments, the volume displacement device can push the fluid(s) in the sample storage portion towards the chromatographic column, preferably at a high pressure. Thus, during step S32 the fluid in the fluid can be output from the storage portion, such that it can be injected to the fluidic path, e.g., to a downstream device of the fluidic path, such as, a chromatographic column.

It will be understood that in such a configuration, the chromatography column 41 acts as a resistive element.

Consider the situation of a constant fluid displacement volume. In such a case, fluid will flow towards and through the chromatography column 41, thus decreasing the amount (i.e., mass) of fluid in the sample storage portion, which will in turn lead to a decrease of the pressure in this section. When knowing the flow resistance through the chromatography column 41 and also through the other components (it is noted that this fluid resistance depends, inter alia, on the geometries of the components, the temperature, the fluids, and the materials of the components), one can determine an expected pressure drop and compare this expected pressure drop with the actual pressure drop to thereby derive a result. For example, if the actual pressure drop is larger than the expected pressure drop, this may again be indicative for a leak in the system.

Conversely, consider the situation of a constant pressure in the sample storage portion. Similarly as above, fluid will flow through the chromatography column 41, and therefore the amount of fluid in the sample storage portion will decrease. To maintain the pressure in this section at a constant value, the fluid displacement volume is increased, and thus, the volume that can be accommodated by the fluid is decreased. Again, when knowing the fluid resistance of the components, an expected change of the fluid displacement volume can be determined, and compared to the change of the fluid displacement volume that is actually used to maintain the pressure in the sample storage portion constant. Again, such a comparison can then be used to determine any malfunctioning of the system, e.g., leakages.

That is, in both cases, a pressure characteristic and a displacement characteristic are obtained after the sample storage portion has been fluidically connected to the fluidic path (step S36), wherein these characteristic are either set or measured. More particularly, in the first example, the fluid displacement volume is constant, and its characteristic can thus be obtained as its set point, while the pressure is measured. In the second example, the pressure is constant (and can therefore be obtained as constant), while the displacement volume is changed and this change is measured.

Further, also in this implementation of the present technology, at least one result is determined based on the obtained pressure characteristic and the obtained displacement characteristic (step S38), e.g., a leakage is determined, as laid out above.

It will be understood that also in this implementation, step S36 can be performed during step S32. Again, step S36 can be performed similarly to steps S16 and S26 (e.g. utilizing the sensor device 56 to obtain the pressure characteristic and obtaining the displacement characteristic from the displacement device).

In a step S38, the method can comprise determining at least one result based on the pressure characteristic and the displacement characteristic, which are obtained after fluidically connecting the sample storage portion to the fluidic path. Obtaining the at least one result in step S38 can comprise determining whether a leakage or blockage is present in at least one of the sample injector and fluidic path. Moreover, obtaining the at least one result in step S38 can comprise determining a leakage rate (in case a leakage is present) or an amount of blockage (in case a blockage is present).

More particularly, based on the pressure characteristic and the displacement characteristic, which are obtained after fluidically connecting the sample storage portion to the fluidic path, a fluid output rate can be determined.

The fluid output rate can be expressed as the summation of the expected flow rate (which can be known from step S32) and the volumetric leak/blockage rate. In case fluid output rate is larger than the expected flow rate, the volumetric leak/blockage rate is positive. In this case the volumetric leak/blockage rate expresses a volumetric leak rate. Alternatively, if the fluid output rate is smaller than the expected flow rate, the volumetric leak/blockage rate is negative. In this case, the volumetric leak/blockage rate expresses a volumetric blockage rate. Based on these rationales, in step S38 not only the presence of a leakage or blockage can be determined, but also the leakage rate or blockage rate (i.e. the amount at which the flow rate is reduced due to blockage).

Ideally, the fluid output rate determined in step S38 matches the expected flow rate (i.e. there is no leakage or blockage). However, in case there is a leakage or blockage the fluid output rate determined in step S38 would not match the expected flow rate. Thus, by comparing, in step S38, the fluid output rate with the expected flow rate, the presence of a leakage or blockage can be determined, as well as, the leak rate and blockage rate (based on the difference).

Similarly, a misconfiguration of the system can be determined. For example, in case the fluid is injected to the downstream device with a higher than expected rate, this can be detected in step S38. The latter issue can, e.g., be due to pump misconfiguration and/or use of an erroneous chromatographic column.

It will be understood that the first method (FIGS. 10 and 11), the second method (FIGS. 12a to 14) and the third method (FIGS. 15a and 15b) can be performed as a single method. For example, the method may comprise steps S10, S12, S14, S16, S18, S22, S24, S26, S28, S32, S36 and S38. Moreover, each of the methods can be a computer implemented method and can be executed, e.g., by the data processing system 60. That is, the data processing system 60 can be configured to carry out the first method (FIGS. 10 and 11), the second method (FIGS. 12a to 14) and the third method (FIGS. 15a and 15b).

In a further aspect, the present invention can relate to a computer program product comprising instructions, which, when the program is executed by a computer (or the data processing system 60) can cause the computer (or the data processing system 60) to carry out the steps of the first method (FIGS. 10 and 11), the second method (FIGS. 12a to 14) and the third method (FIGS. 15a and 15b).

In yet a further aspect the present invention can relate to a computer-readable storage medium comprising instructions, which when the instructions are executed by a computer (or the data processing system 60) can cause the computer (or the data processing system 60) to carry out the steps of the first method (FIGS. 10 and 11), the second method (FIGS. 12a to 14) and the third method (FIGS. 15a and 15b)

Whenever a relative term, such as "about", "substantially" or "approximately" is used in this specification, such a term should also be construed to also include the exact term. That is, e.g., "substantially straight" should be construed to also include "(exactly) straight".

It should also be understood that whenever reference is made to an element this does not exclude a plurality of said elements. For example, if something is said to comprise an element it may comprise a single element but also a plurality of elements.

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

Furthermore, reference numbers and letters appearing between parentheses in the claims, identifying features described in the embodiments and illustrated in the accompanying drawings, are provided as an aid to the reader as an exemplification of the matter claimed. The inclusion of such reference numbers and letters is not to be interpreted as placing any limitations on the scope of the claims.

The invention claimed is:

1. A method for monitoring a sample injector comprising a sample storage portion and a volume displacement device, the method comprising
   obtaining a pressure characteristic indicative for a pressure of the sample storage portion;
   obtaining a displacement characteristic indicative for a displacement volume of the volume displacement device, when the volume displacement device is fluidically connected to the sample storage portion; and
   determining at least one result based on the obtained pressure characteristic and the obtained measured displacement characteristic;
   wherein determining the at least one result comprises
   utilizing the pressure characteristic and displacement characteristic, which are obtained while increasing the pressure in the sample storage portion to the first pressure, to determine a compressibility of a fluid in the sample storage portion and
   utilizing the determined compressibility for at least one of
   determine at least one of a phase and a composition of a fluid in the sample storage portion,
   classify the fluid in the sample storage portion as one or a combination of gas, water, organic chromatography solvent and non-organic chromatography solvent,
   determine a number of different fluid types contained in the sample storage portion,
   determine the presence of a gaseous media in the sample storage portion,
   determine whether the sample storage portion is empty, such as, filled with empty air.

2. The method according to claim 1,
   isolating the sample storage portion from ambient atmosphere,
   increasing the pressure in the sample storage portion while the sample storage portion is isolated from ambient atmosphere to a first pressure;
   wherein the pressure characteristic and the displacement characteristic are obtained after increasing the pressure in the sample storage portion to the first pressure.

3. The method according to claim 1, wherein determining the at least one result comprises
   determining whether a leakage is present in the sample injector (10) based on the pressure characteristic and the displacement characteristic which are obtained after increasing the pressure in the sample storage portion to the first pressure.

4. The method according to claim 1,
   wherein obtaining a pressure characteristic comprises utilizing a sensor device, such as, at least one of pressure sensor, electricity meter and force sensor and
   wherein the volume displacement device comprises a housing and a movable element, wherein the movable element is configured to move inside the housing and
   wherein obtaining the displacement characteristic comprises obtaining a position and/or a feature indicative for the position of the movable element inside the housing.

5. The method according to claim 1, wherein the method is a computer implemented method.

6. A sample injector, wherein the sample injector is configured to carry out the method according to claim 1, wherein the sample injector comprises
   the sample storage portion and the volume displacement device,
   a sensor device configured to measure a pressure and/or a feature indicative for the pressure in the sample storage portion,
   a data processing system.

7. A system, such as, a chromatography system, configured to carry out the method according to claim 1, comprising
   the sample injector including,
      the sample storage portion and the volume displacement device, a sensor device configured to measure a pressure and/or a feature indicative for the pressure in the sample storage portion, and a data processing system, a fluidic path, and wherein the system is configured to allow a fluid connection between the sample injector (10) and the fluidic path.

8. The method according to claim 1, wherein the method further comprises a temperature equilibration phase after increasing the pressure in the sample storage portion to the first pressure and before obtaining the pressure characteristic and the displacement characteristic used to determine whether a leakage is present.

9. The method according to claim 1, wherein the method comprises providing an expected flow rate and/or a feature indicative for the expected flow rate of the fluidic path and wherein determining the at least one result comprises determining whether a leakage or blockage is present in the sample injector and/or in the fluidic path based on the expected flow rate and/or the feature indicative for the expected flow rate of the fluidic path and the pressure characteristic and the displacement characteristic which are obtained after fluidically connecting the sample storage portion to the fluidic path.

10. The method according to claim 1, wherein the pressure characteristic and the displacement characteristic are obtained while increasing the pressure in the sample storage portion to the first pressure.

11. The method according to claim 10, wherein determining the at least one result comprises comparing the determined compressibility to a desired value for the compressibility, and wherein the method comprises determining, based on the comparison, whether an expected fluid is contained in the sample storage portion.

12. The method according to claim 1, wherein the method comprises isolating the sample storage portion from ambient atmosphere, increasing the pressure in the sample storage portion while the sample storage portion is isolated from ambient atmosphere to a first pressure, wherein the first pressure exceeds the ambient pressure by at least 100 bar, preferably by at least 500 bar, further preferably by at least 1000 bar.

13. The method according to claim 12, wherein the method comprises at least one of after increasing the pressure in the sample storage portion to the first pressure, holding the pressure in the sample storage portion constant, after increasing the pressure in the sample storage portion to the first pressure, holding the displacement characteristic of the volume displacement device constant.

14. The method according to claim 12, wherein the sample injector is configured for connecting the sample storage portion to a fluidic path, and wherein the first pressure matches the pressure in the fluidic path, wherein the method comprises fluidically connecting the sample storage portion to the fluidic path, and wherein the pressure characteristic and the displacement characteristic are obtained after fluidically connecting the sample storage portion to the fluidic path.

15. A method for monitoring a sample injector comprising a sample storage portion and a volume displacement device, the method comprising obtaining a pressure characteristic indicative for a pressure of the sample storage portion;

obtaining a displacement characteristic indicative for a displacement volume of the volume displacement device, when the volume displacement device is fluidically connected to the sample storage portion; and determining at least one result based on the obtained pressure characteristic and the obtained measured displacement characteristic;

wherein the pressure characteristic and the displacement characteristic are obtained while increasing the pressure in the sample storage portion to the first pressure;

wherein determining the at least one result comprises comparing the determined compressibility to a desired value for the compressibility, and wherein the method comprises determining, based on the comparison, whether an expected fluid is contained in the sample storage portion.

16. A sample injector, wherein the sample injector is configured to carry out the method according to claim 15, wherein the sample injector comprises the sample storage portion and the volume displacement device, the sensor device configured to measure a pressure and/or a feature indicative for the pressure in the sample storage portion, a data processing system.

17. A system, such as, a chromatography system, configured to carry out the method according to claim 15, comprising the sample injector including:

the sample storage portion and the volume displacement device, the sensor device configured to measure a pressure and/or a feature indicative for the pressure in the sample storage portion, and a data processing system, a fluidic path, and wherein the system is configured to allow a fluid connection between the sample injector and the fluidic path.

18. The method according to claim 15, wherein determining the at least one result comprises determining whether a leakage is present in the sample injector based on the pressure characteristic and the displacement characteristic which are obtained after increasing the pressure in the sample storage portion to the first pressure.

19. The method according to claim 15, wherein the method further comprises a temperature equilibration phase after increasing the pressure in the sample storage portion to the first pressure and before obtaining the pressure characteristic and the displacement characteristic used to determine whether a leakage is present.

20. The method according to claim 15, wherein the method comprises providing an expected flow rate and/or a feature indicative for the expected flow rate of the fluidic path and wherein determining the at least one result comprises determining whether a leakage or blockage is present in the sample injector and/or in the fluidic path based on the expected flow rate and/or the feature indicative for the expected flow rate of the fluidic path and the pressure characteristic and the displacement characteristic which are obtained after fluidically connecting the sample storage portion to the fluidic path.

21. The method according to claim 15,
wherein obtaining a pressure characteristic comprises utilizing a sensor device, such as, at least one of pressure sensor, electricity meter and force sensor and
wherein the volume displacement device comprises a housing and a movable element, wherein the movable element is configured to move inside the housing and
wherein obtaining the displacement characteristic comprises obtaining a position and/or a feature indicative for the position of the movable element inside the housing.

22. The method according to claim 15, wherein the method is a computer implemented method.

23. The method according to claim 15, wherein the method comprises
isolating the sample storage portion from ambient atmosphere,
increasing the pressure in the sample storage portion while the sample storage portion is isolated from ambient atmosphere to a first pressure,
wherein the first pressure exceeds the ambient pressure by at least 100 bar, preferably by at least 500 bar, further preferably by at least 1000 bar.

24. The method according to claim 23,
wherein the pressure characteristic and the displacement characteristic are obtained after increasing the pressure in the sample storage portion to the first pressure.

25. The method according to claim 23, wherein the method comprises at least one of
after increasing the pressure in the sample storage portion to the first pressure, holding the pressure in the sample storage portion constant,
after increasing the pressure in the sample storage portion to the first pressure, holding the displacement characteristic of the volume displacement device constant.

26. The method according to claim 23,
wherein the sample injector is configured for connecting the sample storage portion to a fluidic path, and
wherein the first pressure matches the pressure in the fluidic path,
wherein the method comprises fluidically connecting the sample storage portion to the fluidic path, and
wherein the pressure characteristic and the displacement characteristic are obtained after fluidically connecting the sample storage portion to the fluidic path.

27. A method for monitoring a sample injector comprising a sample storage portion and a volume displacement device, the method comprising
obtaining a pressure characteristic indicative for a pressure of the sample storage portion;
obtaining a displacement characteristic indicative for a displacement volume of the volume displacement device, when the volume displacement device is fluidically connected to the sample storage portion; and
determining at least one result based on the obtained pressure characteristic and the obtained measured displacement characteristic;
wherein the method further comprises a temperature equilibration phase after increasing the pressure in the sample storage portion to the first pressure and before obtaining the pressure characteristic and the displacement characteristic used to determine whether a leakage is present.

28. A sample injector, wherein the sample injector is configured to carry out the method according to claim 27, wherein the sample injector comprises
the sample storage portion and the volume displacement device,
the sensor device configured to measure a pressure and/or a feature indicative for the pressure in the sample storage portion,
a data processing system.

29. A system, such as, a chromatography system, configured to carry out the method according to claim 27, comprising
the sample injector including:
the sample storage portion and the volume displacement device,
the sensor device configured to measure a pressure and/or a feature indicative for the pressure in the sample storage portion, and
a data processing system,
a fluidic path, and
wherein the system is configured to allow a fluid connection between the sample injector and the fluidic path.

30. The method according to claim 27,
wherein the pressure characteristic and the displacement characteristic are obtained while increasing the pressure in the sample storage portion to the first pressure.

31. The method according to claim 27, wherein determining the at least one result comprises
determining whether a leakage is present in the sample injector based on the pressure characteristic and the displacement characteristic which are obtained after increasing the pressure in the sample storage portion to the first pressure.

32. The method according to claim 27,
wherein the method comprises providing an expected flow rate and/or a feature indicative for the expected flow rate of the fluidic path and
wherein determining the at least one result comprises determining whether a leakage or blockage is present in the sample injector and/or in the fluidic path based on
the expected flow rate and/or the feature indicative for the expected flow rate of the fluidic path and
the pressure characteristic and the displacement characteristic which are obtained after fluidically connecting the sample storage portion to the fluidic path.

33. The method according to claim 27,
wherein obtaining a pressure characteristic comprises utilizing a sensor device, such as, at least one of pressure sensor, electricity meter and force sensor and
wherein the volume displacement device comprises a housing and a movable element, wherein the movable element is configured to move inside the housing and
wherein obtaining the displacement characteristic comprises obtaining a position and/or a feature indicative for the position of the movable element inside the housing.

34. The method according to claim 27, wherein the method is a computer implemented method.

35. The method according to claim 27, wherein the method comprises
isolating the sample storage portion from ambient atmosphere,
increasing the pressure in the sample storage portion while the sample storage portion is isolated from ambient atmosphere to a first pressure,
wherein the first pressure exceeds the ambient pressure by at least 100 bar, preferably by at least 500 bar, further preferably by at least 1000 bar.

36. The method according to claim 35,
wherein the pressure characteristic and the displacement characteristic are obtained after increasing the pressure in the sample storage portion to the first pressure.

37. The method according to claim 35, wherein the method comprises at least one of
after increasing the pressure in the sample storage portion to the first pressure, holding the pressure in the sample storage portion constant,
after increasing the pressure in the sample storage portion to the first pressure, holding the displacement characteristic of the volume displacement device constant.

38. The method according to claim 35,
wherein the sample injector is configured for connecting the sample storage portion to a fluidic path, and wherein the first pressure matches the pressure in the fluidic path,
wherein the method comprises fluidically connecting the sample storage portion to the fluidic path, and
wherein the pressure characteristic and the displacement characteristic are obtained after fluidically connecting the sample storage portion to the fluidic path.

39. A method for monitoring a sample injector comprising a sample storage portion and a volume displacement device, the method comprising
obtaining a pressure characteristic indicative for a pressure of the sample storage portion;
obtaining a displacement characteristic indicative for a displacement volume of the volume displacement device, when the volume displacement device is fluidically connected to the sample storage portion; and
determining at least one result based on the obtained pressure characteristic and the obtained measured displacement characteristic;
wherein the method comprises
isolating the sample storage portion from ambient atmosphere,
increasing the pressure in the sample storage portion while the sample storage portion is isolated from ambient atmosphere to a first pressure,
wherein the first pressure exceeds the ambient pressure by at least 100 bar, preferably by at least 500 bar, further preferably by at least 1000 bar;
wherein the method comprises at least one of
after increasing the pressure in the sample storage portion to the first pressure, holding the pressure in the sample storage portion constant,
after increasing the pressure in the sample storage portion to the first pressure, holding the displacement characteristic of the volume displacement device constant.

40. A sample injector, wherein the sample injector is configured to carry out the method according to claim 39, wherein the sample injector comprises
the sample storage portion and the volume displacement device,
the sensor device configured to measure a pressure and/or a feature indicative for the pressure in the sample storage portion,
a data processing system.

41. A system, such as, a chromatography system, configured to carry out the method according to claim 39, comprising
the sample injector including:
the sample storage portion and the volume displacement device,
the sensor device configured to measure a pressure and/or a feature indicative for the pressure in the sample storage portion, and
a data processing system,
a fluidic path, and
wherein the system is configured to allow a fluid connection between the sample injector and the fluidic path.

42. The method according to claim 39,
wherein the pressure characteristic and the displacement characteristic are obtained while increasing the pressure in the sample storage portion to the first pressure.

43. The method according to claim 39,
wherein the pressure characteristic and the displacement characteristic are obtained after increasing the pressure in the sample storage portion to the first pressure.

44. The method according to claim 39, wherein determining the at least one result comprises
determining whether a leakage is present in the sample injector based on the pressure characteristic and the displacement characteristic which are obtained after increasing the pressure in the sample storage portion to the first pressure.

45. The method according to claim 39,
wherein the sample injector is configured for connecting the sample storage portion to a fluidic path, and wherein the first pressure matches the pressure in the fluidic path,
wherein the method comprises fluidically connecting the sample storage portion to the fluidic path, and
wherein the pressure characteristic and the displacement characteristic are obtained after fluidically connecting the sample storage portion to the fluidic path.

46. The method according to claim 39,
wherein the method comprises providing an expected flow rate and/or a feature indicative for the expected flow rate of the fluidic path and
wherein determining the at least one result comprises determining whether a leakage or blockage is present in the sample injector and/or in the fluidic path based on
the expected flow rate and/or the feature indicative for the expected flow rate of the fluidic path and
the pressure characteristic and the displacement characteristic which are obtained after fluidically connecting the sample storage portion to the fluidic path.

47. The method according to claim 39,
wherein obtaining a pressure characteristic comprises utilizing a sensor device, such as, at least one of pressure sensor, electricity meter and force sensor and
wherein the volume displacement device comprises a housing and a movable element, wherein the movable element is configured to move inside the housing and
wherein obtaining the displacement characteristic comprises obtaining a position and/or a feature indicative for the position of the movable element inside the housing.

48. The method according to claim 39, wherein the method is a computer implemented method.

49. A method for monitoring a sample injector comprising a sample storage portion and a volume displacement device, the method comprising
obtaining a pressure characteristic indicative for a pressure of the sample storage portion;
obtaining a displacement characteristic indicative for a displacement volume of the volume displacement device, when the volume displacement device is fluidically connected to the sample storage portion; and determining at least one result based on the obtained pressure characteristic and the obtained measured displacement characteristic;

wherein the method comprises isolating the sample storage portion from ambient atmosphere, increasing the pressure in the sample storage portion while the sample storage portion is isolated from ambient atmosphere to a first pressure, wherein the first pressure exceeds the ambient pressure by at least 100 bar, preferably by at least 500 bar, further preferably by at least 1000 bar;

wherein the sample injector is configured for connecting the sample storage portion to a fluidic path, and wherein the first pressure matches the pressure in the fluidic path, wherein the method comprises fluidically connecting the sample storage portion to the fluidic path, and wherein the pressure characteristic and the displacement characteristic are obtained after fluidically connecting the sample storage portion to the fluidic path.

50. A sample injector, wherein the sample injector is configured to carry out the method according to claim 49, wherein the sample injector comprises the sample storage portion and the volume displacement device, the sensor device configured to measure a pressure and/or a feature indicative for the pressure in the sample storage portion, a data processing system.

51. A system, such as, a chromatography system, configured to carry out the method according to claim 49, comprising the sample injector including the sample storage portion and the volume displacement device, the sensor device configured to measure a pressure and/or a feature indicative for the pressure in the sample storage portion, and a data processing system, a fluidic path, and wherein the system is configured to allow a fluid connection between the sample injector and the fluidic path.

52. The method according to claim 49, wherein the pressure characteristic and the displacement characteristic are obtained while increasing the pressure in the sample storage portion to the first pressure.

53. The method according to claim 49, wherein the pressure characteristic and the displacement characteristic are obtained after increasing the pressure in the sample storage portion to the first pressure.

54. The method according to claim 49, wherein determining the at least one result comprises determining whether a leakage is present in the sample injector based on the pressure characteristic and the displacement characteristic which are obtained after increasing the pressure in the sample storage portion to the first pressure.

55. The method according to claim 49, wherein the method comprises providing an expected flow rate and/or a feature indicative for the expected flow rate of the fluidic path and wherein determining the at least one result comprises determining whether a leakage or blockage is present in the sample injector and/or in the fluidic path based on the expected flow rate and/or the feature indicative for the expected flow rate of the fluidic path and the pressure characteristic and the displacement characteristic which are obtained after fluidically connecting the sample storage portion to the fluidic path.

56. The method according to claim 49, wherein obtaining a pressure characteristic comprises utilizing a sensor device, such as, at least one of pressure sensor, electricity meter and force sensor and wherein the volume displacement device comprises a housing and a movable element, wherein the movable element is configured to move inside the housing and wherein obtaining the displacement characteristic comprises obtaining a position and/or a feature indicative for the position of the movable element inside the housing.

57. The method according to claim 49, wherein the method is a computer implemented method.

58. The method according to claim 49, wherein the pressure characteristic and the displacement characteristic are obtained after increasing the pressure in the sample storage portion to the first pressure.

59. The method according to claim 49, wherein determining the at least one result comprises determining whether a leakage is present in the sample injector based on the pressure characteristic and the displacement characteristic which are obtained after increasing the pressure in the sample storage portion to the first pressure.

60. A method for monitoring a sample injector comprising a sample storage portion and a volume displacement device, the method comprising obtaining a pressure characteristic indicative for a pressure of the sample storage portion;

obtaining a displacement characteristic indicative for a displacement volume of the volume displacement device, when the volume displacement device is fluidically connected to the sample storage portion; and determining at least one result based on the obtained pressure characteristic and the obtained measured displacement characteristic;

wherein the method comprises providing an expected flow rate and/or a feature indicative for the expected flow rate of the fluidic path and wherein determining the at least one result comprises determining whether a leakage or blockage is present in the sample injector and/or in the fluidic path based on the expected flow rate and/or the feature indicative for the expected flow rate of the fluidic path and the pressure characteristic and the displacement characteristic which are obtained after fluidically connecting the sample storage portion to the fluidic path.

61. A sample injector, wherein the sample injector is configured to carry out the method according to claim 60, wherein the sample injector comprises the sample storage portion and the volume displacement device, the sensor device configured to measure a pressure and/or a feature indicative for the pressure in the sample storage portion, a data processing system.

62. A system, such as, a chromatography system, configured to carry out the method according to claim 60, comprising the sample injector including:

the sample storage portion and the volume displacement device, the sensor device configured to measure a pressure and/or a feature indicative for the pressure in the sample storage portion, and a data processing system, a fluidic path, and wherein the system is configured to allow a fluid connection between the sample injector and the fluidic path.

63. The method according to claim 60, wherein the method comprises isolating the sample storage portion from ambient atmosphere, increasing the pressure in the sample storage portion while the sample storage portion is isolated from ambient atmosphere to a first pressure, wherein the first pressure exceeds the ambient pressure by at least 100 bar, preferably by at least 500 bar, further preferably by at least 1000 bar.

64. The method according to claim 60, wherein the pressure characteristic and the displacement characteristic are obtained while increasing the pressure in the sample storage portion to the first pressure.

65. The method according to claim 60, wherein obtaining a pressure characteristic comprises utilizing a sensor device, such as, at least one of pressure sensor, electricity meter and force sensor and wherein the volume displacement device comprises a housing and a movable element, wherein the movable element is configured to move inside the housing and wherein obtaining the displacement characteristic comprises obtaining a position and/or a feature indicative for the position of the movable element inside the housing.

66. The method according to claim 60, wherein the method is a computer implemented method.

\* \* \* \* \*